United States Patent
Neukirch et al.

(10) Patent No.: US 9,684,060 B2
(45) Date of Patent: Jun. 20, 2017

(54) ULTRASOUND-BASED LOCALIZATION OF CLIENT DEVICES WITH INERTIAL NAVIGATION SUPPLEMENT IN DISTRIBUTED COMMUNICATION SYSTEMS AND RELATED DEVICES AND METHODS

(71) Applicants: Ulrich Wilhelm Heinz Neukirch, Painted Post, NY (US); Ofer Saban, Vienna, VA (US)

(72) Inventors: Ulrich Wilhelm Heinz Neukirch, Painted Post, NY (US); Ofer Saban, Vienna, VA (US)

(73) Assignee: CorningOptical Communications LLC, Hickory, NC (US)

( * ) Notice: Subject to any disclaimer, the term of this patent is extended or adjusted under 35 U.S.C. 154(b) by 232 days.

(21) Appl. No.: 14/533,383

(22) Filed: Nov. 5, 2014

(65) Prior Publication Data
US 2015/0268327 A1    Sep. 24, 2015

Related U.S. Application Data

(63) Continuation of application No. PCT/US2013/043107, filed on May 29, 2013.
(Continued)

(51) Int. Cl.
*G01S 5/26* (2006.01)
*G01S 1/80* (2006.01)
(Continued)

(52) U.S. Cl.
CPC ............ *G01S 5/26* (2013.01); *G01S 1/76* (2013.01); *G01S 1/802* (2013.01); *G01S 5/0257* (2013.01); *G01S 5/0263* (2013.01); *G01S 5/18* (2013.01)

(58) Field of Classification Search
None
See application file for complete search history.

(56) References Cited

U.S. PATENT DOCUMENTS 2,628,312 A    2/1953    Peterson et al.
3,848,254 A    11/1974   Drebinger et al.
(Continued)

FOREIGN PATENT DOCUMENTS

AU    2010100320 A4    6/2010    .............. G01S 3/02
CN    1222007 A        7/1999
(Continued)

OTHER PUBLICATIONS

Schwarz, Volker, et al., "Accuracy of a Commercial UWB 3D Location/Tracking System and its Impact on LT Application Scenarios," International Conference on Ultra-Wideband, Sep. 5-8, 2005, IEEE, 5 pages.
(Continued)

*Primary Examiner* — John A Tweel, Jr.
*Assistant Examiner* — Shawna M Kingston
(74) *Attorney, Agent, or Firm* — C. Keith Montgomery

(57) ABSTRACT

Spatially located ultrasound beacons are provided in known locations within a distributed communication system. The ultrasound beacons are configured to emit ultrasound pulses that can be received by client devices in ultrasound communication range of the beacons. The client devices are configured to analyze the received ultrasound pulses from the beacons to determine their time-difference of arrival and as a result, their location(s) within the distributed communication system. The client devices comprise inertial navigation systems (INS) that calculate client device location as the client device moves, and when received ultrasound signals are below a predefined threshold.

25 Claims, 13 Drawing Sheets

Related U.S. Application Data

(60) Provisional application No. 61/652,575, filed on May 29, 2012.

(51) Int. Cl.
*G01S 5/02* (2010.01)
*G01S 5/18* (2006.01)
*G01S 1/76* (2006.01)

(56) References Cited

U.S. PATENT DOCUMENTS

| | | |
|---|---|---|
| 3,986,182 A | 10/1976 | Hackett |
| 4,167,738 A | 9/1979 | Kirkendall |
| 4,935,746 A | 6/1990 | Wells |
| 5,206,655 A | 4/1993 | Caille et al. |
| 5,257,407 A | 10/1993 | Heinzelmann |
| 5,339,259 A | 8/1994 | Puma et al. |
| 5,396,224 A | 3/1995 | Dukes et al. |
| 5,513,176 A | 4/1996 | Dean et al. |
| 5,544,173 A | 8/1996 | Meltzer |
| 5,602,903 A | 2/1997 | LeBlanc et al. ............... 379/60 |
| 5,615,132 A | 3/1997 | Horton et al. |
| 5,726,984 A | 3/1998 | Kubler et al. |
| 5,790,536 A | 8/1998 | Mahany et al. |
| 5,873,040 A | 2/1999 | Dunn et al. ................ 455/456 |
| 5,969,837 A | 10/1999 | Farber et al. |
| 6,011,962 A | 1/2000 | Lindenmeier et al. |
| 6,046,838 A | 4/2000 | Kou et al. |
| 6,108,536 A | 8/2000 | Yafuso et al. |
| 6,128,470 A | 10/2000 | Naidu et al. |
| 6,178,334 B1 | 1/2001 | Shyy et al. |
| 6,195,561 B1 | 2/2001 | Rose |
| 6,218,979 B1 | 4/2001 | Barnes et al. |
| 6,222,503 B1 | 4/2001 | Gietema et al. |
| 6,236,365 B1 | 5/2001 | LeBlanc et al. .............. 342/457 |
| 6,249,252 B1 | 6/2001 | Dupray ........................ 342/450 |
| 6,253,067 B1 | 6/2001 | Tsuji |
| 6,314,163 B1 | 11/2001 | Acampora |
| 6,317,599 B1 | 11/2001 | Rappaport et al. |
| 6,323,980 B1 | 11/2001 | Bloom |
| 6,330,244 B1 | 12/2001 | Swartz et al. |
| 6,389,010 B1 | 5/2002 | Kubler et al. |
| 6,405,018 B1 | 6/2002 | Reudink et al. |
| 6,437,577 B1 | 8/2002 | Fritzmann et al. |
| 6,452,915 B1 | 9/2002 | Jorgensen |
| 6,490,439 B1 | 12/2002 | Croft et al. |
| 6,518,916 B1 | 2/2003 | Ashihara et al. |
| 6,580,402 B2 | 6/2003 | Navarro et al. |
| 6,580,905 B1 | 6/2003 | Naidu et al. |
| 6,615,074 B2 | 9/2003 | Mickle et al. |
| 6,657,535 B1 | 12/2003 | Magbie et al. |
| 6,658,269 B1 | 12/2003 | Golemon et al. |
| 6,670,930 B2 | 12/2003 | Navarro |
| 6,731,880 B2 | 5/2004 | Westbrook et al. |
| 6,763,226 B1 | 7/2004 | McZeal, Jr. |
| 6,771,933 B1 | 8/2004 | Eng et al. |
| 6,782,048 B2 | 8/2004 | Santhoff |
| 6,842,433 B2 | 1/2005 | West et al. |
| 6,850,510 B2 | 2/2005 | Kubler et al. |
| 6,876,056 B2 | 4/2005 | Tilmans et al. |
| 6,876,945 B2 | 4/2005 | Emord |
| 6,889,060 B2 | 5/2005 | Fernando et al. |
| 6,900,732 B2 | 5/2005 | Richards |
| 6,906,681 B2 | 6/2005 | Hoppenstein |
| 6,909,399 B1 | 6/2005 | Zegelin et al. ................ 342/463 |
| 6,919,858 B2 | 7/2005 | Rofougaran |
| 6,928,281 B2 | 8/2005 | Ward et al. |
| 6,952,181 B2 | 10/2005 | Karr et al. .................... 342/457 |
| 6,961,312 B2 | 11/2005 | Kubler et al. |
| 6,963,727 B2 | 11/2005 | Shreve |
| 6,983,174 B2 | 1/2006 | Hoppenstein et al. |
| 7,015,826 B1 | 3/2006 | Chan et al. |
| 7,020,473 B2 | 3/2006 | Splett |
| 7,024,166 B2 | 4/2006 | Wallace et al. |
| 7,035,594 B2 | 4/2006 | Wallace et al. |
| 7,047,028 B2 | 5/2006 | Cagenius |
| 7,050,017 B2 | 5/2006 | King et al. |
| 7,053,838 B2 | 5/2006 | Judd |
| 7,072,586 B2 | 7/2006 | Aburakawa et al. |
| 7,084,758 B1 | 8/2006 | Cole ........................ 340/539.11 |
| 7,113,780 B2 | 9/2006 | McKenna et al. |
| 7,129,886 B2 | 10/2006 | Hall et al. |
| 7,142,535 B2 | 11/2006 | Kubler et al. |
| 7,146,134 B2 | 12/2006 | Moon et al. |
| 7,177,623 B2 | 2/2007 | Baldwin |
| 7,183,910 B2 | 2/2007 | Alvarez et al. ........... 340/539.13 |
| 7,194,275 B2 | 3/2007 | Bolin et al. ................ 455/456.6 |
| 7,196,656 B2 | 3/2007 | Shirakawa |
| 7,199,443 B2 | 4/2007 | Elsharawy |
| 7,233,771 B2 | 6/2007 | Proctor, Jr. et al. |
| 7,256,727 B2 | 8/2007 | Fullerton et al. |
| 7,260,369 B2 | 8/2007 | Feher |
| 7,272,359 B2 | 9/2007 | Li et al. |
| 7,298,327 B2 | 11/2007 | Dupray et al. ................ 342/451 |
| 7,315,735 B2 | 1/2008 | Graham ..................... 455/404.1 |
| 7,324,476 B2 | 1/2008 | Agrawal et al. |
| 7,324,837 B2 | 1/2008 | Yamakita |
| 7,336,961 B1 | 2/2008 | Ngan ........................ 455/456.1 |
| 7,359,674 B2 | 4/2008 | Markki et al. |
| 7,359,718 B2 | 4/2008 | Tao et al. |
| 7,366,151 B2 | 4/2008 | Kubler et al. |
| 7,369,526 B2 | 5/2008 | Lechleider et al. |
| 7,385,384 B2 | 6/2008 | Rocher |
| 7,388,892 B2 | 6/2008 | Nishiyama et al. |
| 7,395,181 B2 | 7/2008 | Foxlin |
| 7,412,224 B2 | 8/2008 | Kotola et al. |
| 7,421,288 B2 | 9/2008 | Funakubo |
| 7,451,365 B2 | 11/2008 | Wang et al. |
| 7,460,507 B2 | 12/2008 | Kubler et al. |
| 7,471,243 B2 | 12/2008 | Roslak |
| 7,495,560 B2 | 2/2009 | Easton et al. |
| 7,512,450 B2 | 3/2009 | Ahmed |
| 7,525,484 B2 | 4/2009 | Dupray et al. ................ 342/450 |
| 7,535,796 B2 | 5/2009 | Holm et al. .................. 367/100 |
| 7,542,452 B2 | 6/2009 | Penumetsa |
| 7,548,833 B2 | 6/2009 | Ahmed |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,599,420 B2 | 10/2009 | Forenza et al. |
| 7,627,218 B2 | 12/2009 | Hurley |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylanen et al. |
| 7,679,562 B2 | 3/2010 | Shirakawa |
| 7,688,811 B2 | 3/2010 | Kubler et al. |
| 7,693,486 B2 | 4/2010 | Kasslin et al. |
| 7,693,654 B1 | 4/2010 | Dietsch et al. |
| 7,697,467 B2 | 4/2010 | Kubler et al. |
| 7,698,228 B2 | 4/2010 | Gailey et al. .................. 705/64 |
| 7,714,778 B2 | 5/2010 | Dupray .................... 342/357.01 |
| 7,715,375 B2 | 5/2010 | Kubler et al. |
| 7,751,374 B2 | 7/2010 | Donovan |
| 7,751,838 B2 | 7/2010 | Ramesh et al. |
| 7,751,971 B2 | 7/2010 | Chang et al. ................. 701/207 |
| 7,760,703 B2 | 7/2010 | Kubler et al. |
| 7,764,231 B1 | 7/2010 | Karr et al. .................... 342/457 |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,787,887 B2 | 8/2010 | Gupta et al. |
| 7,809,012 B2 | 10/2010 | Ruuska et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,654 B2 | 12/2010 | Sauer et al. |
| 7,848,765 B2 | 12/2010 | Phillips et al. ............ 455/456.3 |

(56) References Cited

U.S. PATENT DOCUMENTS

| | | |
|---|---|---|
| 7,848,770 B2 | 12/2010 | Scheinert |
| 7,853,234 B2 | 12/2010 | Afsahi |
| 7,860,518 B2 | 12/2010 | Flanagan et al. ........ 455/456.1 |
| 7,860,519 B2 | 12/2010 | Portman et al. ........ 455/456.3 |
| 7,864,673 B2 | 1/2011 | Bonner |
| 7,870,321 B2 | 1/2011 | Rofougaran |
| 7,881,665 B2 | 2/2011 | Symons |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,903,029 B2 | 3/2011 | Dupray ........................ 342/457 |
| 7,907,972 B2 | 3/2011 | Walton et al. |
| 7,912,043 B2 | 3/2011 | Kubler et al. |
| 7,916,066 B1 | 3/2011 | Osterweil |
| 7,916,706 B2 | 3/2011 | Kubler et al. |
| 7,920,553 B2 | 4/2011 | Kubler et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,952,512 B1 | 5/2011 | Delker et al. |
| 7,957,777 B1 | 6/2011 | Vu et al. |
| 7,969,009 B2 | 6/2011 | Chandrasekaran |
| 7,969,911 B2 | 6/2011 | Mahany et al. |
| 7,970,648 B2 | 6/2011 | Gailey et al. ............. 705/14.49 |
| 7,990,925 B2 | 8/2011 | Tinnakornsrisuphap et al. |
| 7,996,020 B1 | 8/2011 | Chhabra |
| 7,996,281 B2 | 8/2011 | Alvarez et al. ............. 705/27.2 |
| 8,005,050 B2 | 8/2011 | Scheinert et al. .......... 370/335 |
| 8,018,907 B2 | 9/2011 | Kubler et al. |
| 8,032,153 B2 | 10/2011 | Dupray et al. ........... 455/456.1 |
| 8,036,308 B2 | 10/2011 | Rofougaran |
| 8,072,381 B1 | 12/2011 | Ziegler ........................ 342/386 |
| 8,073,565 B2 | 12/2011 | Johnson ....................... 700/245 |
| 8,081,923 B1 | 12/2011 | Larsen et al. ................. 455/18 |
| 8,082,096 B2 | 12/2011 | Dupray ........................ 701/207 |
| 8,082,353 B2 | 12/2011 | Huber et al. |
| 8,086,192 B2 | 12/2011 | Rofougaran et al. |
| 8,090,383 B1 | 1/2012 | Emigh et al. ............. 455/456.1 |
| 8,111,998 B2 | 2/2012 | George et al. |
| 8,135,413 B2 | 3/2012 | Dupray ..................... 455/456.1 |
| 8,175,649 B2 | 5/2012 | Saban et al. |
| 8,203,910 B2 | 6/2012 | Zhao et al. |
| 8,213,264 B2 | 7/2012 | Lee et al. ..................... 367/127 |
| 8,326,315 B2 | 12/2012 | Phillips et al. ........... 455/456.1 |
| 8,364,171 B2 | 1/2013 | Busch ....................... 455/456.1 |
| 8,442,556 B2 | 5/2013 | Rawat et al. |
| 8,570,914 B2 | 10/2013 | Sauer |
| 8,604,909 B1 | 12/2013 | Amir et al. |
| 8,774,843 B2 | 7/2014 | Mangold et al. .......... 455/456.5 |
| 8,983,301 B2 | 3/2015 | Baker et al. |
| RE45,505 E | 5/2015 | Scheinert |
| 9,184,843 B2 | 11/2015 | Berlin et al. |
| 2001/0022782 A1 | 9/2001 | Steudle |
| 2002/0123365 A1 | 9/2002 | Thorson et al. |
| 2003/0078074 A1 | 4/2003 | Sesay et al. |
| 2003/0083052 A1 | 5/2003 | Hosaka |
| 2003/0142587 A1 | 7/2003 | Zeitzew |
| 2003/0146871 A1 | 8/2003 | Karr et al. .................... 342/457 |
| 2003/0157943 A1 | 8/2003 | Sabat, Jr. ...................... 455/456 |
| 2003/0220835 A1 | 11/2003 | Barnes, Jr. |
| 2004/0022215 A1 | 2/2004 | Okuhata et al. |
| 2004/0102196 A1 | 5/2004 | Weckstrom et al. ...... 454/456.1 |
| 2004/0131025 A1 | 7/2004 | Dohler et al. |
| 2004/0146020 A1 | 7/2004 | Kubler et al. |
| 2004/0151164 A1 | 8/2004 | Kubler et al. |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0165573 A1 | 8/2004 | Kubler et al. |
| 2004/0175173 A1 | 9/2004 | Deas |
| 2004/0179852 A1 | 9/2004 | Westbrook et al. |
| 2004/0198386 A1 | 10/2004 | Dupray ..................... 455/456.1 |
| 2004/0235497 A1 | 11/2004 | Zekavat |
| 2004/0246926 A1 | 12/2004 | Belcea et al. ................ 370/332 |
| 2005/0003873 A1 | 1/2005 | Naidu et al. |
| 2005/0020309 A1 | 1/2005 | Moeglein et al. ......... 455/456.1 |
| 2005/0102180 A1 | 5/2005 | Gailey et al. ................... 705/14 |
| 2005/0143091 A1 | 6/2005 | Shapira et al. ............ 455/456.1 |
| 2005/0147071 A1 | 7/2005 | Karaoguz et al. |
| 2005/0148306 A1 | 7/2005 | Hiddink |
| 2005/0153712 A1 | 7/2005 | Osaka et al. ............... 455/456.5 |
| 2005/0246094 A1 | 11/2005 | Moscatiello |
| 2005/0281213 A1 | 12/2005 | Dohn |
| 2006/0014548 A1 | 1/2006 | Bolin et al. ............... 455/456.1 |
| 2006/0025158 A1 | 2/2006 | Leblanc et al. ........... 455/456.2 |
| 2006/0033662 A1 | 2/2006 | Ward et al. |
| 2006/0092880 A1 | 5/2006 | Nounin et al. |
| 2006/0136544 A1* | 6/2006 | Atsmon .................... A63H 3/28 709/200 |
| 2006/0183504 A1 | 8/2006 | Tanaka et al. |
| 2006/0209752 A1 | 9/2006 | Wijngaarden et al. ....... 370/328 |
| 2006/0274704 A1 | 12/2006 | Desai et al. |
| 2006/0276202 A1 | 12/2006 | Moeglein et al. ......... 455/456.1 |
| 2007/0004437 A1 | 1/2007 | Harada et al. |
| 2007/0057761 A1 | 3/2007 | Johnson |
| 2007/0060045 A1 | 3/2007 | Prautzsch |
| 2007/0060055 A1 | 3/2007 | Desai et al. |
| 2007/0070812 A1 | 3/2007 | Lee |
| 2007/0076649 A1 | 4/2007 | Lin et al. |
| 2007/0104128 A1 | 5/2007 | Laroia et al. ................ 370/329 |
| 2007/0104164 A1 | 5/2007 | Laroia et al. ................ 370/338 |
| 2007/0140168 A1 | 6/2007 | Laroia et al. ................ 370/330 |
| 2007/0172241 A1 | 7/2007 | Kwon et al. |
| 2007/0202844 A1 | 8/2007 | Wilson et al. ............. 455/404.2 |
| 2007/0224954 A1 | 9/2007 | Gopi |
| 2007/0253355 A1 | 11/2007 | Hande et al. ................. 371/328 |
| 2007/0257796 A1 | 11/2007 | Easton et al. |
| 2007/0268853 A1 | 11/2007 | Ma et al. ..................... 370/328 |
| 2007/0286599 A1 | 12/2007 | Sauer et al. |
| 2007/0297005 A1 | 12/2007 | Montierth et al. |
| 2008/0013482 A1 | 1/2008 | Kurokawa |
| 2008/0043714 A1 | 2/2008 | Pernu |
| 2008/0058018 A1 | 3/2008 | Scheinert |
| 2008/0077326 A1 | 3/2008 | Funk et al. .................... 701/220 |
| 2008/0080863 A1 | 4/2008 | Sauer et al. |
| 2008/0098203 A1 | 4/2008 | Master et al. |
| 2008/0101277 A1 | 5/2008 | Taylor et al. |
| 2008/0118014 A1 | 5/2008 | Reunamaki et al. |
| 2008/0119208 A1 | 5/2008 | Flanagan et al. .......... 455/456.6 |
| 2008/0129634 A1 | 6/2008 | Pera et al. |
| 2008/0134194 A1 | 6/2008 | Liu |
| 2008/0167049 A1 | 7/2008 | Karr et al. ................. 455/456.2 |
| 2008/0194226 A1 | 8/2008 | Rivas et al. ............... 455/404.2 |
| 2008/0201226 A1 | 8/2008 | Carlson et al. ................. 705/14 |
| 2008/0207253 A1 | 8/2008 | Jaakkola et al. |
| 2008/0232328 A1 | 9/2008 | Scheinert et al. |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0268871 A1 | 10/2008 | Kim et al. |
| 2008/0270522 A1 | 10/2008 | Souissi ........................ 709/203 |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0310341 A1 | 12/2008 | Koyanagi |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0046688 A1 | 2/2009 | Volpi et al. |
| 2009/0059903 A1 | 3/2009 | Kubler et al. |
| 2009/0061796 A1 | 3/2009 | Arkko et al. |
| 2009/0073054 A1 | 3/2009 | Yoon et al. |
| 2009/0073885 A1 | 3/2009 | Jalil et al. .................... 370/241 |
| 2009/0073916 A1 | 3/2009 | Zhang et al. |
| 2009/0143076 A1 | 6/2009 | Wachter et al. |
| 2009/0149221 A1 | 6/2009 | Liu et al. |
| 2009/0154294 A1 | 6/2009 | Jeong et al. |
| 2009/0163224 A1 | 6/2009 | Dean et al. ................ 455/456.1 |
| 2009/0175214 A1 | 7/2009 | Sfar et al. |
| 2009/0176507 A1 | 7/2009 | Wu et al. .................. 455/456.2 |
| 2009/0190441 A1 | 7/2009 | Zhao et al. |
| 2009/0191891 A1 | 7/2009 | Ma et al. .................. 455/456.1 |

(56) References Cited

U.S. PATENT DOCUMENTS

| | | |
|---|---|---|
| 2009/0216449 A1 | 8/2009 | Erko et al. |
| 2009/0218407 A1 | 9/2009 | Rofougaran |
| 2009/0218657 A1 | 9/2009 | Rofougaran |
| 2009/0238566 A1 | 9/2009 | Boldi et al. |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0262604 A1 | 10/2009 | Funada |
| 2009/0280835 A1 | 11/2009 | Males et al. |
| 2009/0285147 A1 | 11/2009 | Subasic et al. |
| 2009/0316529 A1 | 12/2009 | Huuskonen et al. |
| 2010/0002626 A1 | 1/2010 | Schmidt et al. |
| 2010/0007485 A1 | 1/2010 | Kodrin et al. ............ 340/539.13 |
| 2010/0008337 A1 | 1/2010 | Bajko |
| 2010/0027443 A1 | 2/2010 | LoGalbo et al. |
| 2010/0048163 A1 | 2/2010 | Parr et al. |
| 2010/0056200 A1 | 3/2010 | Tolonen |
| 2010/0061291 A1 | 3/2010 | Wala |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0097268 A1* | 4/2010 | Roh ........................ G01S 19/47 342/357.3 |
| 2010/0118864 A1 | 5/2010 | Kubler et al. |
| 2010/0121567 A1 | 5/2010 | Mendelson ................... 701/206 |
| 2010/0127937 A1 | 5/2010 | Chandrasekaran et al. |
| 2010/0128568 A1 | 5/2010 | Han et al. ........................ 367/99 |
| 2010/0130233 A1 | 5/2010 | Parker ........................ 455/456.3 |
| 2010/0134257 A1 | 6/2010 | Puleston et al. |
| 2010/0135178 A1 | 6/2010 | Aggarwal et al. |
| 2010/0148373 A1 | 6/2010 | Chandrasekaran |
| 2010/0151821 A1 | 6/2010 | Sweeney et al. ............. 455/410 |
| 2010/0156721 A1 | 6/2010 | Alamouti et al. |
| 2010/0157738 A1 | 6/2010 | Izumi et al. |
| 2010/0178936 A1 | 7/2010 | Wala et al. ................. 455/456.2 |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0234045 A1 | 9/2010 | Karr et al. ................. 455/456.1 |
| 2010/0246558 A1 | 9/2010 | Harel |
| 2010/0254356 A1 | 10/2010 | Tynderfeldt et al. |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0273504 A1 | 10/2010 | Bull et al. ................. 455/456.1 |
| 2010/0287011 A1 | 11/2010 | Muchkaev ........................ 705/7 |
| 2010/0290355 A1 | 11/2010 | Roy et al. |
| 2010/0291949 A1 | 11/2010 | Shapira et al. ............. 455/456.1 |
| 2010/0309049 A1 | 12/2010 | Reunamaki et al. |
| 2010/0309752 A1 | 12/2010 | Lee et al. ........................ 367/99 |
| 2010/0311472 A1 | 12/2010 | Rofougaran et al. |
| 2010/0311480 A1 | 12/2010 | Raines et al. |
| 2010/0317371 A1 | 12/2010 | Westerinen et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0019999 A1 | 1/2011 | George et al. ................... 398/58 |
| 2011/0021146 A1 | 1/2011 | Pernu |
| 2011/0021224 A1 | 1/2011 | Koskinen et al. |
| 2011/0028157 A1 | 2/2011 | Larsen ........................ 455/456.1 |
| 2011/0028161 A1 | 2/2011 | Larsen ........................ 455/456.1 |
| 2011/0035284 A1 | 2/2011 | Moshfeghi ................. 705/14.58 |
| 2011/0050501 A1 | 3/2011 | Aljadeff ........................ 342/387 |
| 2011/0065450 A1 | 3/2011 | Kazmi |
| 2011/0068981 A1 | 3/2011 | Marks et al. |
| 2011/0069668 A1 | 3/2011 | Chion et al. |
| 2011/0071734 A1 | 3/2011 | Van Wiemeersch et al. |
| 2011/0071785 A1 | 3/2011 | Heath |
| 2011/0086614 A1 | 4/2011 | Brisebois et al. ............ 455/411 |
| 2011/0116572 A1 | 5/2011 | Lee et al. |
| 2011/0124347 A1 | 5/2011 | Chen et al. ................. 455/456.1 |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0159876 A1 | 6/2011 | Segall et al. ..................... 45/442 |
| 2011/0159891 A1 | 6/2011 | Segall et al. ................. 455/456.3 |
| 2011/0171912 A1 | 7/2011 | Beck et al. ................. 455/67.11 |
| 2011/0171946 A1 | 7/2011 | Soehren ........................ 455/418 |
| 2011/0171973 A1 | 7/2011 | Beck et al. ................. 455/456.2 |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0210843 A1 | 9/2011 | Kummetz ........................ 340/517 |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. ............. 455/456.2 |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0268452 A1 | 11/2011 | Beamon et al. |
| 2011/0274021 A1 | 11/2011 | He et al. |
| 2011/0279445 A1 | 11/2011 | Murphy et al. ................. 345/419 |
| 2011/0281536 A1 | 11/2011 | Lee et al. |
| 2011/0312340 A1 | 12/2011 | Wu et al. ..................... 455/456.1 |
| 2012/0028649 A1 | 2/2012 | Gupta et al. ................. 455/456.1 |
| 2012/0039320 A1 | 2/2012 | Lemson et al. ................. 370/338 |
| 2012/0046049 A1 | 2/2012 | Curtis et al. ................. 455/456.3 |
| 2012/0058775 A1 | 3/2012 | Dupray et al. ............. 455/456.1 |
| 2012/0065926 A1 | 3/2012 | Lee et al. |
| 2012/0072106 A1 | 3/2012 | Han et al. ..................... 701/410 |
| 2012/0081248 A1 | 4/2012 | Kennedy et al. ............. 342/118 |
| 2012/0084177 A1 | 4/2012 | Tanaka et al. ............. 705/26.41 |
| 2012/0087212 A1 | 4/2012 | Vartanian et al. ............ 367/118 |
| 2012/0095779 A1 | 4/2012 | Wengrovitz et al. ............. 705/3 |
| 2012/0108258 A1 | 5/2012 | Li ............................. 455/456.1 |
| 2012/0130632 A1 | 5/2012 | Bandyopadhyay et al. .. 701/446 |
| 2012/0135755 A1 | 5/2012 | Lee et al. ..................... 455/456.2 |
| 2012/0158297 A1 | 6/2012 | Kim et al. ..................... 701/516 |
| 2012/0158509 A1 | 6/2012 | Zivkovic et al. ........... 705/14.58 |
| 2012/0179548 A1 | 7/2012 | Sun et al. ..................... 705/14.58 |
| 2012/0179549 A1 | 7/2012 | Sigmund et al. ........... 705/14.58 |
| 2012/0179561 A1 | 7/2012 | Sun et al. ..................... 705/26.3 |
| 2012/0196626 A1 | 8/2012 | Fano et al. ................. 455/456.3 |
| 2012/0215438 A1 | 8/2012 | Liu et al. ..................... 701/409 |
| 2012/0221392 A1 | 8/2012 | Baker et al. ................. 705/14.17 |
| 2012/0232917 A1 | 9/2012 | Al-Khudairy et al. ........... 705/2 |
| 2012/0243469 A1 | 9/2012 | Klein ............................. 370/328 |
| 2012/0303446 A1 | 11/2012 | Busch ........................ 705/14.45 |
| 2012/0303455 A1 | 11/2012 | Busch ........................ 705/14.57 |
| 2012/0309336 A1 | 12/2012 | Tanaka et al. |
| 2012/0310836 A1 | 12/2012 | Eden et al. ..................... 705/44 |
| 2013/0006663 A1 | 1/2013 | Bertha et al. ..................... 705/3 |
| 2013/0006849 A1 | 1/2013 | Morris ............................. 705/39 |
| 2013/0036012 A1 | 2/2013 | Lin et al. ..................... 705/14.58 |
| 2013/0040654 A1 | 2/2013 | Parish ........................ 455/456.1 |
| 2013/0041761 A1 | 2/2013 | Voda |
| 2013/0045758 A1 | 2/2013 | Khorashadi et al. ....... 455/456.3 |
| 2013/0046691 A1 | 2/2013 | Culton ............................. 705/44 |
| 2013/0066821 A1 | 3/2013 | Moore et al. ..................... 706/45 |
| 2013/0073336 A1 | 3/2013 | Heath ........................ 705/7.29 |
| 2013/0073377 A1 | 3/2013 | Heath ........................ 705/14.39 |
| 2013/0073388 A1 | 3/2013 | Heath ........................ 705/14.53 |
| 2013/0073422 A1 | 3/2013 | Moore et al. ................. 705/26.7 |
| 2013/0080578 A1 | 3/2013 | Murad et al. ................. 709/217 |
| 2013/0084859 A1 | 4/2013 | Azar ............................. 455/435.1 |
| 2013/0116922 A1 | 5/2013 | Cai et al. |
| 2013/0131972 A1 | 5/2013 | Kumar et al. |
| 2013/0157664 A1 | 6/2013 | Chow et al. |
| 2013/0281125 A1 | 10/2013 | Schmidt |
| 2013/0314210 A1 | 11/2013 | Schoner et al. |
| 2013/0322214 A1 | 12/2013 | Neukirch et al. |

(56) References Cited

U.S. PATENT DOCUMENTS

| | | | |
|---|---|---|---|
| 2013/0322415 A1 | 12/2013 | Chamarti et al. | ............. 370/338 |
| 2014/0050482 A1 | 2/2014 | Berlin et al. | |
| 2014/0112667 A1 | 4/2014 | Neukirch et al. | |
| 2014/0180581 A1 | 6/2014 | Berlin et al. | |
| 2014/0213285 A1 | 7/2014 | Sauer | |
| 2014/0233548 A1 | 8/2014 | Leizerovich et al. | |
| 2014/0323150 A1 | 10/2014 | Mangold et al. | .......... 455/456.1 |
| 2015/0005005 A1 | 1/2015 | Neukirch et al. | |
| 2015/0087329 A1 | 3/2015 | Stratford et al. | |
| 2015/0155942 A1 | 6/2015 | Baker et al. | |
| 2015/0317557 A1 | 11/2015 | Julian et al. | |

FOREIGN PATENT DOCUMENTS

| | | | |
|---|---|---|---|
| CN | 1242911 A | 1/2000 | |
| EP | 0732827 A2 | 9/1996 | |
| EP | 1124211 A2 | 8/2001 | |
| EP | 1347584 A2 | 9/2003 | |
| EP | 1448008 A1 | 8/2004 | |
| EP | 1005774 B1 | 3/2007 | |
| EP | 1954019 A1 | 8/2008 | |
| EP | 2192811 A1 | 6/2010 | |
| JP | 2009288245 | 12/2009 | ............... G01S 1/80 |
| WO | 9603823 A1 | 2/1996 | |
| WO | 9953838 A1 | 10/1999 | |
| WO | 02087275 A2 | 10/2002 | |
| WO | 03024027 A1 | 3/2003 | |
| WO | 2005060338 A2 | 7/2005 | |
| WO | 2006076600 A1 | 7/2006 | |
| WO | WO2008/099383 A2 | 8/2008 | ............... H04B 7/04 |
| WO | WO2008/099390 A3 | 8/2008 | ............... G01S 3/02 |
| WO | WO2009/081376 A3 | 7/2009 | ............ H04W 24/00 |
| WO | WO2009/097237 A3 | 8/2009 | ............... G01S 1/68 |
| WO | 2010090999 A1 | 8/2010 | |
| WO | WO2011/017700 A1 | 2/2011 | ............... H04B 7/02 |
| WO | WO2011/091859 A1 | 8/2011 | ............ H04W 64/00 |
| WO | WO2011/123336 A1 | 10/2011 | ............ H04B 10/12 |

OTHER PUBLICATIONS

Shibuya, Akinori et al., "A High-Accuracy Pedestrian Positioning Information System Using Pico Cell Techniques," Vehicular Technology Conference Proceedings, May 15-18, 2000, Tokyo, Japan, IEEE, pp. 496-500.
English Translation of the Second Office Action for Chinese Patent Application No. 201080039136.3, mailed Nov. 18, 2014, 11 pages.
Patent Examination Report No. 1 for Australian Patent Application No. 2010276451, mailed Jul. 17, 2014, 3 pages.
International Search Report and Written Opinion for PCT/US2010/042420, mailed Nov. 4, 2010, 17 pages.
Girard, et al., Indoor Pedestrian Navigation Using Foot-Mounted IMU and Portable Ultrasound Range Sensors, www.mdpi.com/journal/sensors, Aug. 2, 2011, pp. 7606-7624.
Kim, et al, "Smartphone-Based Collaborative and Autonomous Radio Fingerprinting," IEEE Transactions on Systems, Man, and Cybernetics—Part C: Applications and Reviews, vol. 42, No. 1, Jan. 2012, pp. 112-122.
Mokni, et al., "Couples sonar inertial navigation system for pedestrian tracking," 8 pages.
"Safe Campus Solutions: Going Beyond Emergency Notification," www.alcatel-lucent.com, 8 pages.
"Cellular Specialties Introduces the First Simulcasted In-building Location-Based Tracking Solution," http://smart-grid.tmcnet.com/news/2009/09/14/4368300.htm, 2 pages.
Gansemer, et al., "RSSI-based Euclidean Distance Algorithm for Indoor Positioning Adapted for use in dynamically changing WLAN environments and multi-level buildings," 2010 International Conference on Indoor Positioning and Indoor Navigation(IPIN), Sep. 15-17, 2010, 6 pages.
Patent Cooperation Treaty, International Search Report for PCT/US2013/043107, Sep. 9, 2013, 5 pages.

Gezici, Sinan, et al., "Localization via Ultra-Wideband Radios: A look at positioning aspects of future sensor networks," IEEE Signal Processing Magazine, vol. 22, No. 4, Jul. 2005, pp. 70-84.
Ingram, S.J., et al., "Ultra WideBand Indoor Positioning Systems and their Use in Emergencies," Position Location and Navigation Symposium, Apr. 2004, pp. 706-715.
Federal Communications Commision (FCC), "Revision of Part 15 of the Commission's Rules Regarding Ultra-Wideband Transmission Systems," First Report and Order, ET Docket 98-153, FCC 02-48; Released Apr. 22, 2002, 118 pages.
Luo, B., et al., "Centralized UWB/WLAN Distribution Network using Low Cost Radio Over Multimode Fiber Technology," IEEE Vehicular Technology Conference, Sep. 2005, pp. 799-801.
Sauer, Michael, et al., "Experimental investigation of multimode fiber bandwidth requirements for 5.2 GHz WLAN signal transmission," Optical Fiber Communication Conference, Mar. 2006, Anaheim, California, 3 pages.
Sauer, Michael, et al., "Experimental Study of Radio Frequency Transmission over Standard and High-Bandwidth Multimode Optical Fibers," International Topical Meeting on Microwave Photonics, Oct. 2005, pp. 99-102.
Wah, Michael, et al., "Wireless Ultra Wideband Communications Using Radio Over Fiber," IEEE Conference on Ultra Wideband Systems and Technologies, Nov. 2003, pp. 265-269.
Non-final Office Action for U.S. Appl. No. 12/509,099, mailed Mar. 11, 2016, 9 pages.
Non-final Office Action for U.S. Appl. No. 13/866,685, mailed May 5, 2016, 16 pages.
Notice of Allowance for U.S. Appl. No. 14/859,542, mailed Apr. 6, 2016, 7 pages.
Final Office Action for U.S. Appl. No. 13/900,859 mailed Feb. 19, 2016, 19 pages.
Author Unknown, "CDMA Co-Pilot Transmitter," Product Specifications, Cellular Specialties, Inc., 021-0000-001 MKTG Rev 2, Aug. 2009, www.cellularspecialties.com, 2 pages.
Chow et al, "Radio-over-Fiber Distributed Antenna System for WiMAX Bullet Train Field Trial," IEEE Mobile WiMAX Symposium, Jul. 9-10, 2009, Napa Valley, California, 4 pages.
Krempels et al., "Directory-Less Indoor Positioning for WLAN Infrastructures extended abstract," IEEE International Symposium on Consumer Electronics, Apr. 14-16, 2008, Vilamoura, Portugal, 2 pages.
Translation of First Office Action for Chinese Patent Application No. 201180019718.X, issued on Jul. 16, 2014, 15 pages.
Translation of the Second Office Action for Chinese Patent Application No. 201180019718.X, issued on Jan. 13, 2015, 10 pages.
Translation of the Third Office Action for Chinese Patent Application No. 201180019718.X issued on Apr. 30, 2015, 10 pages.
Patent Examination Report No. 1 for Australian Patent Application No. 2011232897 issued Jun. 26, 2015, 2 pages.
International Search Report and Written Opinion for PCT/US2010/044884 mailed Oct. 6, 2010, 14 pages.
International Search Report and Written Opinion for PCT/US2011/029895 mailed Jul. 4, 2011, 12 pages.
International Search Report and Written Opinion for PCT/US2011/049122 mailed Jun. 6, 2012, 12 pages.
International Search Report for International Patent Application PCT/US2013/043230 mailed Dec. 4, 2013, 5 pages.
Non-final Office Action for U.S. Appl. No. 12/509,099 mailed Jan. 12, 2012, 8 pages.
Final Office Action for U.S. Appl. No. 12/509,099 mailed Apr. 11, 2012, 11 pages.
Advisory Action for U.S. Appl. No. 12/509,099 mailed Jun. 18, 2012, 3 pages.
Examiner's Answer to the Appeal Brief for U.S. Appl. No. 12/509,099 mailed Nov. 8, 2012, 15 pages.
Decision on Appeal for U.S. Appl. No. 12/509,099 mailed Jul. 15, 2015, 6 pages.
Non-final Office Action for U.S. Appl. No. 13/365,843 mailed Jun. 26, 2013, 10 pages.
Notice of Allowance for U.S. Appl. No. 13/365,843 mailed Jul. 31, 2013, 8 pages.

(56) References Cited

OTHER PUBLICATIONS

Non-final Office Action for U.S. Appl. No. 13/485,038 mailed Dec. 20, 2013, 13 pages.
Non-final Office Action for U.S. Appl. No. 13/628,497 mailed Apr. 24, 2014, 15 pages.
Final Office Action for U.S. Appl. No. 13/628,497 mailed Aug. 7, 2014, 16 pages.
Advisory Action for U.S. Appl. No. 13/628,497 mailed Sep. 17, 2014, 3 pages.
Advisory Action for U.S. Appl. No. 13/628,497 mailed Oct. 6, 2014, 3 pages.
Non-final Office Action for U.S. Appl. No. 13/724,451 mailed Jan. 15, 2015, 8 pages.
Final Office Action for U.S. Appl. No. 13/724,451 mailed May 27, 2015, 10 pages.
Non-final Office Action for U.S. Appl. No. 13/866,685 mailed Mar. 23, 2015, 13 pages.
Non-final Office Action for U.S. Appl. No. 14/034,948 mailed Apr. 1, 2015, 12 pages.
Final Office Action for U.S. Appl. No. 14/034,948 mailed Dec. 1, 2014, 12 pages.
Advisory Action for U.S. Appl. No. 14/034,948 mailed Jan. 27, 2015, 2 pages.
Non-final Office Action for U.S. Appl. No. 14/034,948 mailed Sep. 2, 2014, 11 pages.
Non-final Office Action for U.S. Appl. No. 14/138,580 mailed May 13, 2015, 20 pages.
Translation of the Fourth Office Action for Chinese Patent Application No. 201180019718.X, issued Nov. 4, 2015, 10 pages.
Advisory Action for U.S. Appl. No. 13/866,685, mailed Dec. 4, 2015, 3 pages.
Final Office Action for U.S. Appl. No. 13/866,685, mailed Sep. 30, 2015, 16 pages.
Final Office Action for U.S. Appl. No. 14/138,580, mailed Oct. 5, 2015, 21 pages.
Non-Final Office Action for U.S. Appl. No. 13/900,859, mailed Sep. 23, 2015, 16 pages.
International Search Report for International Patent Application PCT/US2014/033452, mailed Jul. 22, 2014, 4 pages.
International Preliminary Report on Patentability for International Patent Application PCT/US2014/033452, mailed Oct. 27, 2015, 10 pages.
Ho, K. C. et al., "Solution and Performance Analysis of Geolocation by TDOA," IEEE Transactions on Aerospace and Electronic Systems, vol. 29, No. 4, Oct. 1993, pp. 1311-1322.
Notice of Acceptance for Australian Patent Application No. 2011232897, mailed Oct. 26, 2015, 3 pages.
Non-Final Office Action for U.S. Appl. No. 13/866,685, mailed Nov. 16, 2016, 21 pages.
Non-Final Office Action for U.S. Appl. No. 14/616,088, mailed Dec. 8, 2016, 13 pages.
Ex Parte Quayle Action for U.S. Appl. No. 15/281,907, mailed Dec. 2, 2016, 6 pages.
K.C. Ho and Y.T. Chan, IEEE Transactions on Aerospace and Electronic Systems, vol. 29, No. 4, Oct. 1993, pp. 1311-1322.

\* cited by examiner

ULTRASOUND-BASED LOCALIZATION OF CLIENT DEVICES WITH INERTIAL NAVIGATION SUPPLEMENT IN DISTRIBUTED COMMUNICATION SYSTEMS AND RELATED DEVICES AND METHODS

PRIORITY APPLICATION

This application is a continuation of International Application No. PCT/US13/43107 filed on May 29, 2013 which claims the benefit of priority to U.S. Provisional Application No. 61/652,575, filed on May 29, 2012, both applications being incorporated herein by reference.

BACKGROUND

Field of the Disclosure

The technology of the disclosure relates to distributed communication systems, and in particular to providing devices, systems, and methods to allow determination of the location of client devices within distributed communication systems.

Technical Background

Wireless communication is rapidly growing, with ever-increasing demands for high-speed mobile data communication. "Wireless fidelity" or "WiFi" systems and wireless local area networks (WLANs) are now deployed in many different types of areas. Distributed antenna systems communicate with wireless devices called "clients," "client devices," or "wireless client devices," which must reside within the wireless range or "cell coverage area," to communicate with an access point device. Distributed antenna systems are particularly useful inside buildings or other indoor environments where client devices may not otherwise effectively receive radio frequency (RF) signals from a source.

Distributed antenna or distributed communication systems have RF antenna coverage areas, also referred to as "antenna coverage areas." Antenna coverage areas can have a relatively short range—from a few meters up to twenty meters. Combining a number of access point devices creates an array of antenna coverage areas. Because the antenna coverage areas each cover small areas, there are typically only a few client devices per coverage area. This minimizes the amount of bandwidth shared among the wireless system users. Typical indoor distributed communication systems include a central or head-end unit communicatively coupled to a plurality of remote units that each provides an antenna coverage area. The remote units each include RF transceivers coupled to an antenna to transmit communication signals (e.g., RF, data) wirelessly. The remote units are coupled to the head-end station via communication media to receive downlink communication signals to be wirelessly transmitted over an antenna in the coverage area to client devices. The remote units also wirelessly receive uplink communication signals from client devices to be communicated to the head-end station.

FIG. 1 is a schematic diagram of an optical fiber-based distributed communication system 10. The system 10 is configured to create one or more antenna coverage areas for establishing communication with wireless client devices (sometimes referred to herein as mobile terminals) located in the RF range of the antenna coverage areas. The system 10 includes a central unit or head-end unit (HEU) 12, one or more remote antenna units (RAUs) 14 and an optical fiber link 16 that optically couples the HEU 12 to the RAU 14.

The HEU 12 is configured to receive communication over downlink electrical RF signals 18D from a source or sources, such as a network or carrier, and provide such communication to the RAU 14. Such downlink communication signals are received through a conventional input, such as a downlink input. If multiple sources are present, there may be multiple downlink inputs. The HEU 12 is also configured to return communication received from the RAU 14, via uplink electrical RF signals 18U, back to the sources. The optical fiber link 16 includes at least one downlink optical fiber 16D to carry signals communicated from the HEU 12 to the RAU 14 and at least one uplink optical fiber 16U to carry signals communicated from the RAU 14 back to the HEU 12. An interface couples the HEU 12 to the optical fiber link 16. The interface may be a conventional interface configured to receive downlink communication signals and pass the downlink communication signals to the RAU 14 through the link 16.

The system 10 has an antenna coverage area 20 that can be substantially centered about the RAU 14. The antenna coverage area 20 of the RAU 14 forms an RF coverage area 22. The HEU 12 is adapted to perform any one of a number of Radio-over Fiber (RoF) applications, such as radio-frequency identification (RFID), WLAN communication, or cellular phone service. Shown within the antenna coverage area 20 is a client device 24 in the form of a mobile terminal as an example, which may be a cellular telephone, smart phone, tablet computer, or the like. The client device 24 can be any device that is capable of receiving RF communication signals. The client device 24 includes an antenna 26 (e.g., a bipole, monopole, bowtie, inverted F, a wireless card, or the like) adapted to receive and/or send electromagnetic RF signals.

The HEU 12 includes an electrical-to-optical (E/O) converter 28 to communicate the electrical RF signals over the downlink optical fiber 16D to the RAU 14, to in turn be communicated to the client device 24 in the antenna coverage area 20 formed by the RAU 14. The E/O converter 28 converts the downlink electrical RF signals 18D to downlink optical RF signals 30D to be communicated over the downlink optical fiber 16D. The RAU 14 includes an optical-to-electrical (O/E) converter 32 to convert received downlink optical RF signals 30D back to electrical signals to be communicated wirelessly through an antenna 34 of the RAU 14 to client devices 24 located in the antenna coverage area 20.

The antenna 34 receives wireless RF communication from client devices 24 and communicates electrical RF signals representing the wireless RF communication to an E/O converter 36 in the RAU 14. The E/O converter 36 converts the electrical RF signals into uplink optical RF signals 30U to be communicated over the uplink optical fiber 16U. An O/E converter 38 in the HEU 12 converts the uplink optical RF signals 30U into uplink electrical RF signals, which are then communicated as uplink electrical RF signals 18U back to a network.

As noted above, it may be desired to provide the distributed communication system 10 in FIG. 1 indoors, such as inside a building or other facility. Other services may be negatively affected or not possible due to the indoor environment. For example, it may be desired or required to provide localization services for the client devices 24, such as emergency 911 (E911) services. If a client device is located indoors, techniques such as global positioning services (GPS) may not be effective at providing or determining the location of the client device. Indoors, GPS signals are usually too weak to be received by client devices. Further, triangulation and/or trilateration techniques from the outside network may not be able to determine the location of client devices.

Other methods for determining location of client devices may be based on receiving wireless data signals transmitted by existing wireless data devices provided in wireless communication systems (e.g., cell phone network and/or WLAN access points). However, use of existing wireless data signals may only be accurate to down to a resolution of still a relatively large distance (e.g., ten meters) since the client devices may receive wireless data signals from wireless data devices not in close proximity to the client devices. Further, use of existing wireless data signals for localization may necessitate a greater density of RF communication devices than is required for data communication. Thus, determining location of client devices at lower resolution distances (e.g., less than ten (10) meters, floor level in a building, etc.) using wireless communication signals transmitted from existing wireless data devices may not be possible without providing additional, greater densities of these wireless data devices at greater cost and complexity.

SUMMARY OF THE DETAILED DESCRIPTION

Embodiments disclosed herein include ultrasound-based localization of client devices in distributed communication systems. Related devices, systems, and methods are also disclosed. In embodiments disclosed herein, a plurality of spatially located ultrasound beacons are provided in known locations within the distributed communication systems. Each of the spatially located ultrasound beacons is configured to emit ultrasound pulses that can be received by client devices in ultrasound communication range of the ultrasound beacons. The client devices are configured to analyze the received ultrasound pulses from the plurality of ultrasound beacons to determine their time-difference of arrivals at the client device. As a result, the client devices can determine their relative distance to ultrasound beacons in a distributed communication system. In certain embodiments, a master ultrasound beacon is provided that encodes location information in a second channel with emitted ultrasound pulses received by the client devices that can be used with the determined relative distance to determine location of the client device in the distributed communication system.

The distributed communication systems employing ultrasound beacons can facilitate the determining and/or providing of location information to client devices, including wireless client devices that may not otherwise be able to receive, for example, GPS information from GPS satellites. Providing location information to client devices inside a building or other location may make location-based services possible (e.g., emergency 911 (E911) services) for the client devices.

Use of ultrasound pulses by a client device to determine its location in a distributed communication system can provide greater resolution (e.g., sub-meter resolution) in location determination. Increased resolution results from the lower velocity of sound (as opposed to light or radio-frequency signals), which translates into lessened requirements for time resolution in ultrasound pulse measurements. Ultrasound waves experience strong attenuation in buildings walls, ceilings, and floors, thus the ultrasound beacons can be strategically placed to allow client devices to avoid detection of ultrasound waves from other ultrasound beacons not located in proximity to the client devices (e.g., on a different floor). Use of ultrasound pulses to facilitate location determination using time-difference of arrival can also avoid the need to synchronize the clock of the client device.

In one embodiment, an ultrasound beacon for facilitating client devices determining their location in a distributed communication system comprises a controller, and an ultrasound emitter coupled to the controller, the ultrasound emitter configured to emit ultrasound pulses over at least one speaker. The ultrasound beacon also comprises a radio-frequency (RF) receiver coupled to the controller, the RF receiver configured to receive RF synchronization signals comprising synchronization information. The controller is configured to synchronize an internal clock based on the received synchronization information, and to cause the ultrasound emitter to emit ultrasound pulses in synchronization based on the synchronization information with other ultrasound beacons among an ultrasound beacon cluster, to client devices located in the distributed communication system.

In another embodiment, a client device configured to communicate in a distributed communication system comprises a controller, and an ultrasound receiver coupled to the controller. The ultrasound receiver is configured to receive ultrasound pulses over at least one microphone. The client device also comprises a radio-frequency (RF) transceiver coupled to the controller, the RF transceiver configured to wirelessly receive and transmit RF communication signals over at least one antenna. The client device also comprises an inertial navigation system (INS) operatively coupled to the controller. The controller is configured to calculate a position using received ultrasound signals, and use the INS to calculate a second position from the first position when the received ultrasound signals are below a predefined threshold.

In another embodiment, a method of a RF communication client device configured to communicate in a distributed communication system determining location within the distributed communication systems is provided. The method comprise calculating a first position using ultrasound signals received at the client device and calculating a second position using an inertial navigation system within the client device when a signal strength of the ultrasounds signals falls below a predefined threshold.

Additional features and advantages will be set forth in the detailed description which follows, and in part will be apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure.

The drawings illustrate various exemplary embodiments, and together with the description serve to explain the principles and operation of the concepts disclosed.

DETAILED DESCRIPTION

Embodiments disclosed herein include ultrasound-based localization of client devices in distributed communication systems, and elated devices, systems, and methods. Ultrasound is sound at one or more wave frequencies higher than what humans can hear. The upper frequency limit of human hearing is different for different individuals and decreases with increasing age. For example, the lower limit of ultrasound wave frequencies may be approximately 16 KHz or 20 KHz. Ultrasound pulses are bursts of ultrasound waves. Client devices are configured to analyze the received ultrasound pulses from the plurality of ultrasound beacons to determine their time-difference of arrivals at the client device. As a result, the client devices can determine their relative distance to ultrasound beacons in a distributed communication system. In certain embodiments, a master ultrasound beacon is provided that encodes location information in a second channel with emitted ultrasound pulses received by the client devices that can be used with the determined relative distance to determine location of the client device in the distributed communication system. The client devices may comprise inertial navigation systems (INS) that calculate client device location as the client device moves, and when received ultrasound signals are below a predefined threshold.

Figure 1:
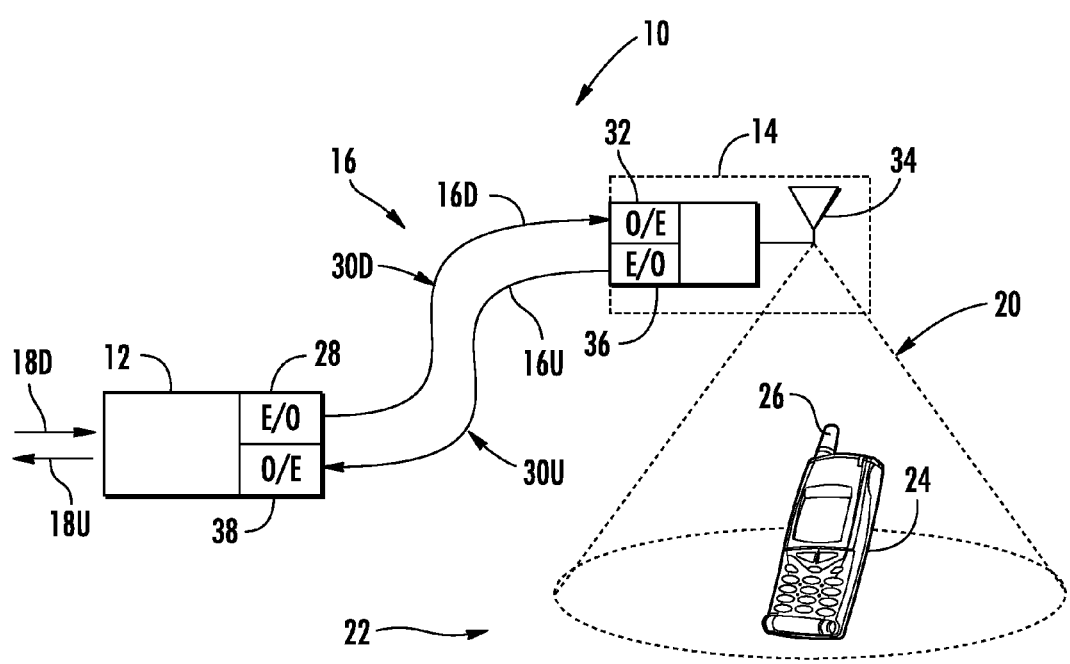
FIG. 1 is a schematic diagram of an exemplary optical fiber-based distributed communication system.
Figure 2:
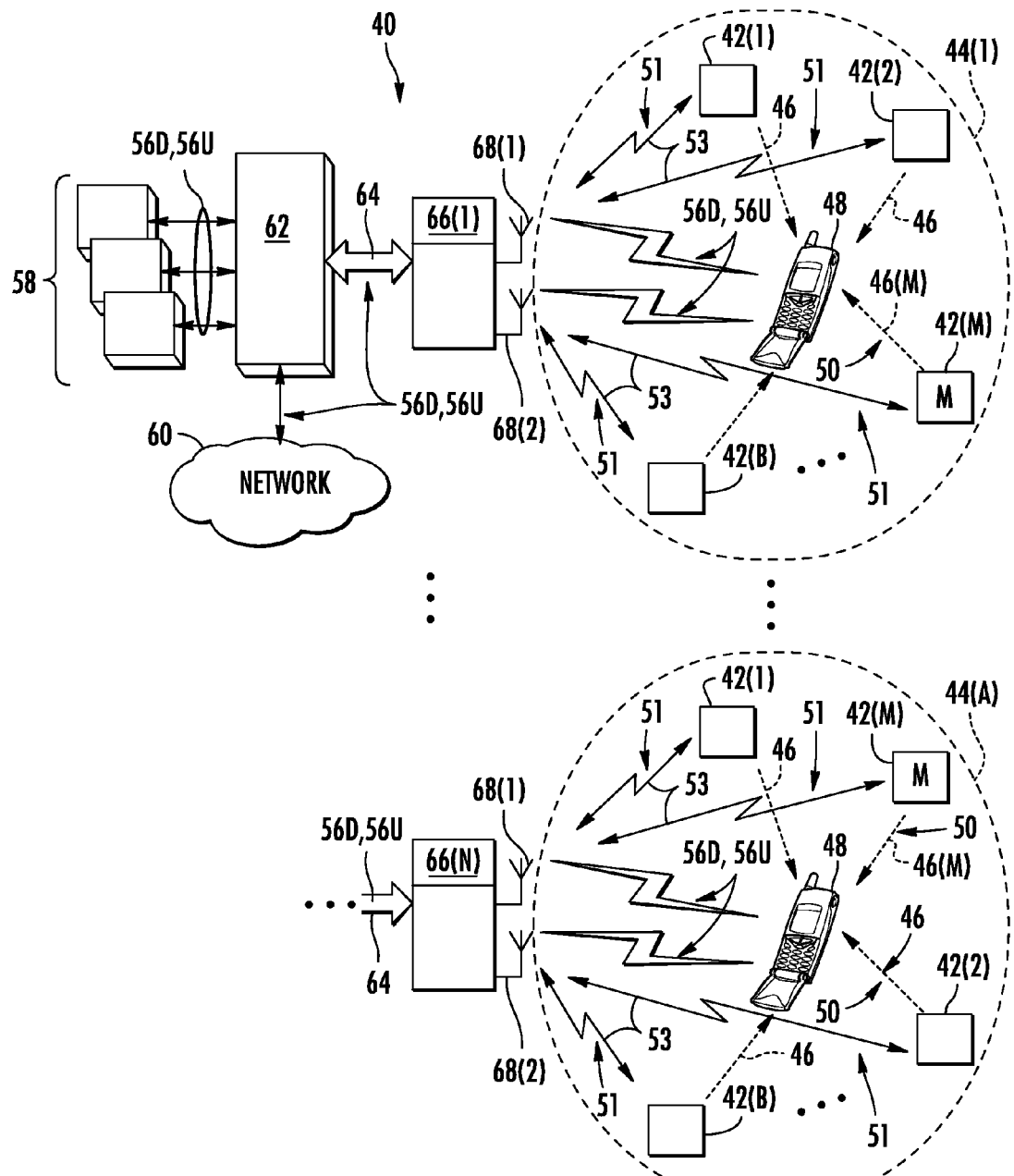
FIG. 2 is a schematic diagram of a distributed communication system employing a plurality of ultrasound beacons organized in ultrasound beacon clusters and configured to emit ultrasound pulses to be received by client devices to determine their location(s)

In this regard, FIG. 2 is a schematic diagram of an exemplary distributed communication system 40 employing a plurality of ultrasound beacons 42 organized in ultrasound beacon clusters 44. The ultrasound beacons 42 are configured to emit ultrasound pulses 46 to be received by client devices 48 in the distributed communication system 40. The distributed communication system 40 may be provided indoors in a building or other structure where it is difficult or impossible for the client device 48 to receive global positioning system (GPS) signals to determine location. In this example, a plurality of ultrasound beacon clusters 44(1)-44(A) are provided, wherein 'A' can be any positive whole integer. Each ultrasound beacon cluster 44(1)-44(A) includes a plurality of non-master ultrasound beacons 42(1)-42(B) and one master ultrasound beacon 42(M) in this example, wherein 'B' can be any positive whole integer.

With continuing reference to FIG. 2 and as will be discussed in more detail below, the master ultrasound beacons 42(M) are configured to encode as location information 50, their location and the location of the other ultrasound beacons 42(1)-42(B) in their ultrasound beacon cluster 44 with the ultrasound pulses 46(M) emitted to the client devices 48. The client devices 48 receive ultrasound pulses 46 from other ultrasound beacons 42(1)-42(B). The client devices 48, equipped with a microphone to detect the ultrasound pulses 46 and other components, are configured to determine their location using the received location information 50 and determining the time-difference-of-arrival between the different received ultrasound pulses 46, 46(M). The client devices 48 use time-difference-of-arrival analysis to determine their location relative to the master ultrasound beacon 42(M) and the non-master ultrasound beacons 42(1)-42(B) in the distributed communication system 40. The determined location of the client devices 48 can be provided to another device or network for any purpose desired.

With continuing reference to FIG. 2 and as will also be discussed in more detail below, the ultrasound beacons 42(1)-42(B), 42(M) are also capable of receiving synchronization information 51 over received communication signals or synchronization signals, which are RF synchronization signals 53 in this example. The synchronization signals could be provided by other communication methods or mediums. For example, the synchronization signals could be provided as described in U.S. Pat. No. 8,175,649 entitled METHOD AND SYSTEM FOR REAL TIME CONTROL OF AN ACTIVE ANTENNA OVER A DISTRIBUTED ANTENNA SYSTEM, which is hereby incorporated by reference in its entirety. In this example, the RF synchronization signals 53 can be distributed by the remote units 66(1)-66(N) in the distributed communication system 40 to the ultrasound beacons 42(1)-42(B), 42(M) as one convenient method. Regardless of the distribution method of the RF synchronization signals 53, the synchronization information 51 is used by the ultrasound beacons 42(1)-42(B), 42(M) to synchronize their internal clocks used to control emission of the ultrasound pulses 46, 46(M). In this manner, the client devices 48 can distinguish between ultrasound pulses 46, 46(M) received from different ultrasound beacons 42(1)-42(B), 42(M) to analyze their time-difference-of-arrivals to determine location. By synchronizing the ultrasound beacons 42(1)-42(B), 42(M), the client devices 48 do not have to be synchronized with the ultrasound beacons 42(1)-42(B), 42(M).

With continuing reference to FIG. 2, note that different numbers of ultrasound beacons 42 can be provided in different ultrasound beacon clusters 44(1)-44(A) as long as at least one master ultrasound beacon 42(M) and a plurality of other non-master ultrasound beacons 42(1)-42(B) are provided in each ultrasound beacon cluster 44(1)-44(A). The ultrasound beacon clusters 44(1)-44(A) may be arranged in the distributed communication system 40 such that a client device 48 can receive ultrasound pulses 46 only from ultrasound beacons 42 in one ultrasound beacon cluster 44(1)-44(A) for a given location of the client device 48. This limitation can be provided as range limitations by placement of the ultrasound beacon clusters 44(1)-44(A) with respect to each other and/or differences in carrier frequencies as non-limiting examples. In this manner, the client device 48 does not receive ultrasound pulses 46 from two different ultrasound beacon clusters 44(1)-44(A) that cannot be compared in a time-difference-of-arrival analysis for a given location of the client device 48. Also, the client device 48 would not receive location information 50 from multiple master ultrasound beacons 42(M) in a given location of the client device 48.

Figure 3:
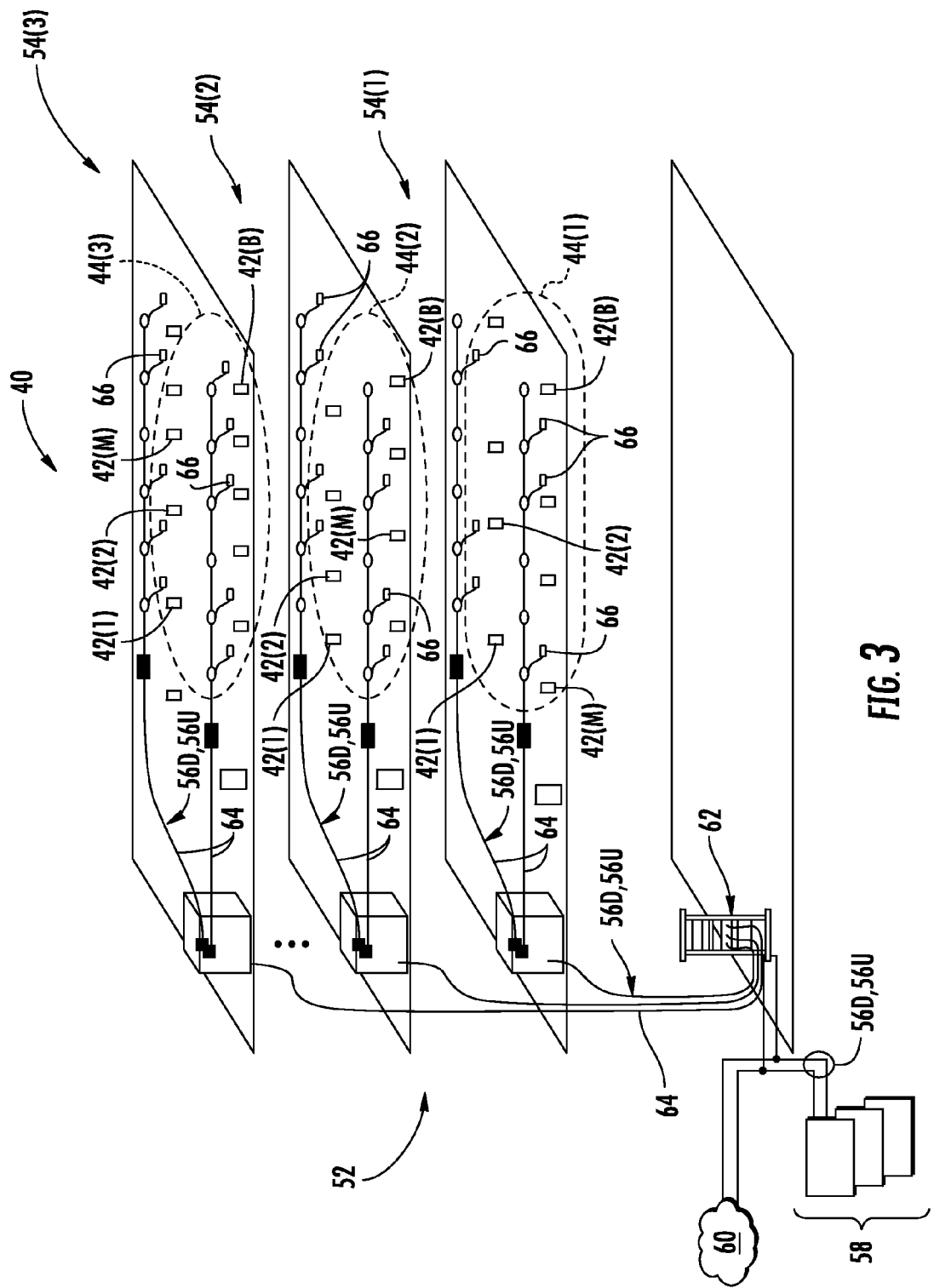
FIG. 3 is a schematic diagram of a distributed communication system employing ultrasound beacon clusters in different floors of a building.

For example, as illustrated in FIG. 3, the distributed communication system 40 may be provided in a building infrastructure 52. The ultrasound beacon clusters 44(1)-44(A) may be on each floor of a building infrastructure 52. For example, the ultrasound beacon cluster 44(1) may be provided on a first floor 54(1) of the building infrastructure 52. The ultrasound beacon cluster 44(2) may be provided on a second floor 54(2) of the building infrastructure 52. The ultrasound beacon cluster 44(3) may be provided on the third floor 54(1) of the building infrastructure 52.

With reference to FIGS. 2 and 3, the ultrasound beacon clusters 44(1)-44(A) are configured to be provided in the distributed communication system 40 that is also configured to downlink and uplink distributed communication signals 56D, 56U from base stations 58 and/or a network 60 to and from the client device 48. In this regard, a central unit 62 is provided that is configured to receive downlink communication signals 56D from the base stations(s) 58 and/or the network 60 for distribution of a communication media 64 to one or more remote units 66(1)-66(N). The remote units 66(1)-66(N) include at least one RF antenna 68(1), 68(2) configured to radiate the downlink communication signals 56D to the client devices 48. Multiple RF antennas 68(1), 68(2) may be provided for multiple input, multiple output (MIMO) communication. The remote units 66(1)-66(N) are also configured to receive uplink communication signals 56U from the client devices 48 to be distributed over the communication media 64 to the central unit 62 to be provided to the base station(s) 58 and/or the network 60.

With continuing references to FIGS. 2 and 3, the communication media 64 in the distributed communication system 40 could be one or a plurality of communication medium, and/or any of different types. For example, the communication media 64 may be electrical conductors, such as twisted-pair wiring or coaxial cable. Frequency division multiplexing (FDM) or time division multiplexing (TDM) can be employed to provide the downlink and uplink communication signals 56D, 56U between the central unit 62 and the remote units 66(1)-66(N). Alternatively, separate, dedicated communication media 64 may be provided between the central unit 62 and the remote units 66(1)-66(N). Further, the downlink and uplink communication signals 56D, 56U could include digital data signals and/or RF communication signals.

Examples of digital data services provided with digital data signals include, but are not limited to, Ethernet, WLAN, WiMax, WiFi, Digital Subscriber Line (DSL), and LTE, etc. Ethernet standards could be supported, including but not limited to 100 Megabits per second (Mbs) (i.e., fast Ethernet) or Gigabit (Gb) Ethernet, or ten Gigabit (10G) Ethernet. Examples of RF communication services provided with RF communication signals include, but are not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink), and medical telemetry frequencies.

Figure 4:
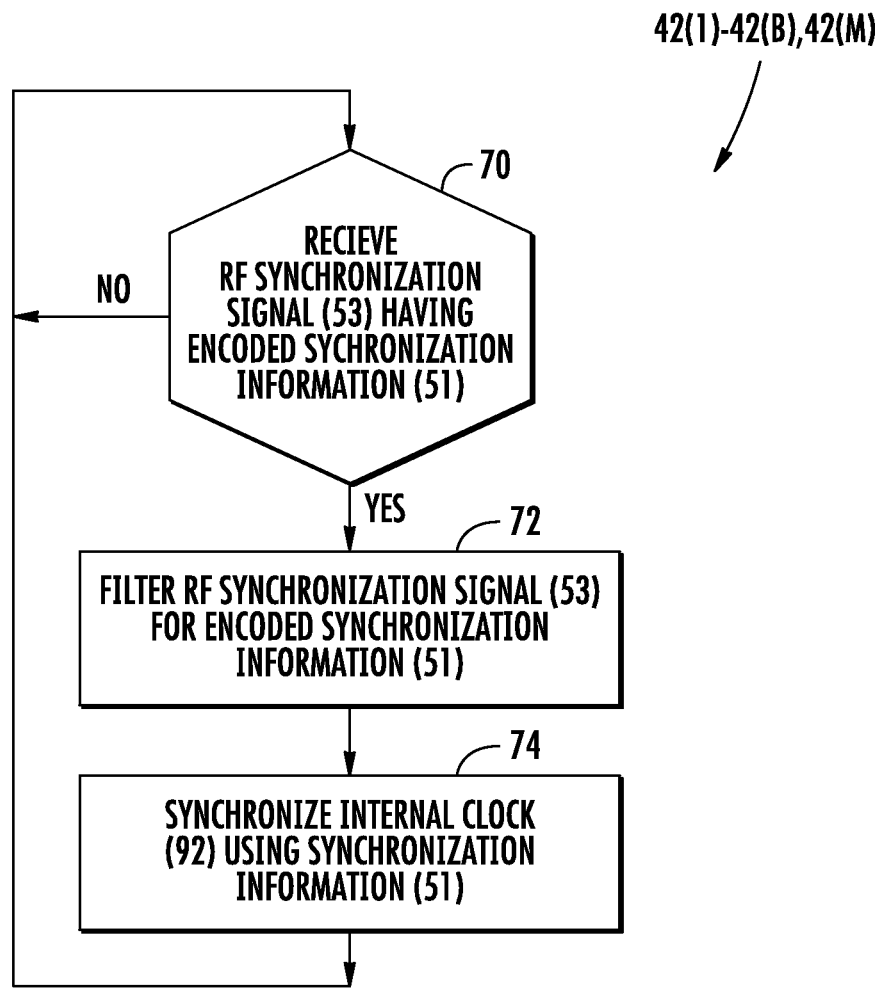
FIG. 4 is a flowchart illustrating a process of an ultrasound beacon receiving radio-frequency (RF) signals including synchronization information used by ultrasound beacons to synchronize their internal clocks used to control ultrasound pulse emission.

As discussed above with regard to distributed communication system 40 in FIG. 2 the ultrasound beacons 42(1)-42(B), 42(M) are synchronized. This is opposed to having to synchronize the client devices 48 to the ultrasound beacons 42(1)-42(B), 42(M). The ultrasound beacons 42(1)-42(B), 42(M) are synchronized to each other so that the ultrasound pulses 46, 46(M) are emitted by the ultrasound beacons 42(1)-42(B), 42(M) in synchronization to the client devices 48. In this manner, the client devices 48 can distinguish between ultrasound pulses 46, 46(M) received from different ultrasound beacons 42(1)-42(B), 42(M) to analyze their time-difference-of-arrivals to determine location. In this regard, FIG. 4 provides a flowchart illustrating an exemplary process of an ultrasound beacon 42(1)-42(B), 42(M) receiving RF synchronization signals 53 including synchronization information 51. The synchronization information 51 is used by the ultrasound beacons 42(1)-42(B), 42(M) to synchronize their internal clocks used to synchronize ultrasound pulse 46, 46(M) emission. Alternatively, the synchronization information 51 may be a central clock signal that is received by all ultrasound beacons 42(1)-42(B), 42(M) and used to synchronize ultrasound pulse 46, 46(M) emission.

Figure 5:
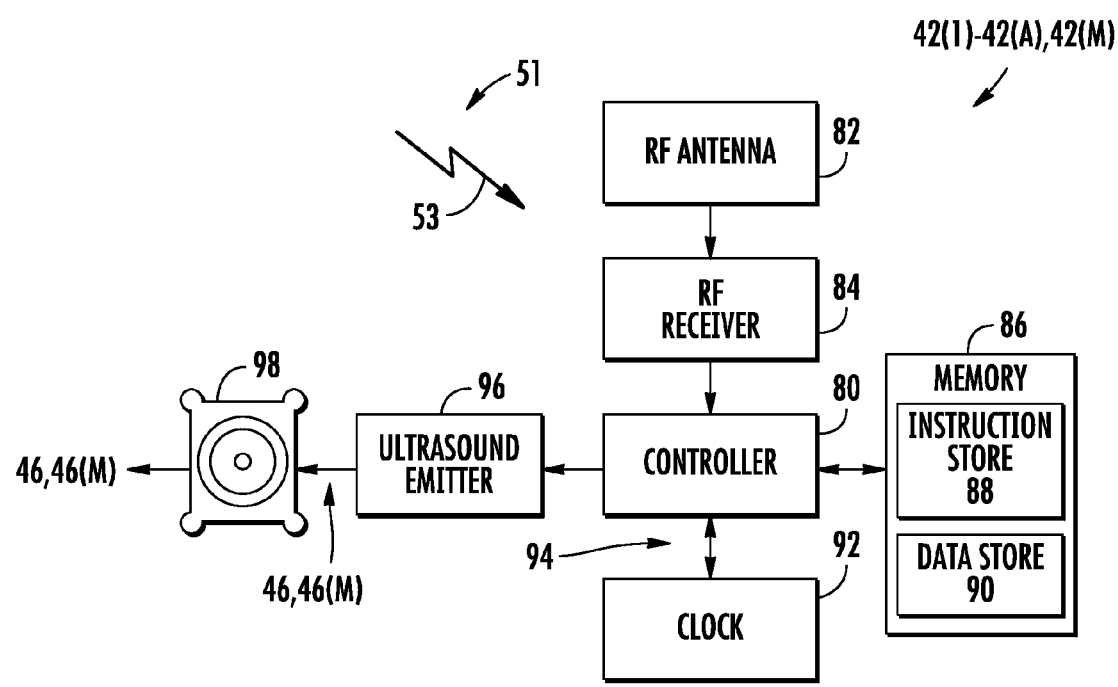
FIG. 5 is a schematic diagram of an ultrasound beacon that can be employed in the distributed communication system in FIG. 2, wherein the ultrasound beacon may be a master ultrasound beacon or a non-master ultrasound beacon.

With reference to FIG. 4, a controller 80 of the ultrasound beacon 42(1)-42(B), 42(M), which is schematically illustrated by example in FIG. 5 determines if a RF synchronization signal 53 having encoded synchronization information 51 has been received (block 70 in FIG. 4). As illustrated in FIG. 5, the ultrasound beacon 42(1)-42(B), 42(M) includes an RF antenna 82 coupled to a RF receiver 84. The RF antenna 82 is configured to receive the RF synchronization signal 53 having the encoded synchronization information 51. For example, the RF synchronization signal 53 may be communicated using a radio frequency identification (RFID), Zigbee, or Dash7 protocol, as non-limiting examples. The RF antenna 82 is coupled to the RF receiver 84, which is configured to provide the encoded synchronization information 51 to the controller 80. The controller 80 is coupled to memory 86 that includes instruction store 88 and data store 90. The instruction store 88 contains instructions executed by the controller 80 to control the operations of the ultrasound beacon 42(1)-42(B), 42(M). The data store 90 allows the synchronization information 51 to be stored as well as other data, such as an identification indicia of the ultrasound beacon 42(1)-42(B), 42(M), as examples.

With continuing reference to FIG. 4, the controller 80 can filter the RF synchronization signal 53 for the encoded synchronization information 51 (block 72 in FIG. 4). The controller 80 can then use the synchronization information 51 to synchronize an internal clock 92 in the ultrasound beacon 42(1)-42(B), 42(M), as illustrated in FIG. 5 (block 74 in FIG. 4). The internal clock 92 emits a clock signal 94 that is used by controller 80 to control the emission of ultrasound pulses 46, 46(M). The controller 80 is coupled to an ultrasound emitter 96 that is configured to emit the ultrasound pulses 46, 46(M). The ultrasound emitter 96 is coupled to at least one speaker 98 that emits the ultrasound pulses 46, 46(M) as sound that can be received and recorded by the client devices 48 to perform time-difference-of-arrival analysis to determine the location of the client device 48 in the distributed communication system 40.

As one non-limiting synchronization example, the synchronization information 51 may be used by the ultrasound beacons 42(1)-42(B), 42(M) to emit ultrasound pulses 46, 46(M) in sequence. The sequence of ultrasound pulses 46, 46(M) arriving at a client device 48 is the same as the emission sequence and temporal overlap of ultrasound pulses 46, 46(M) is avoided. In this manner, there is sufficient separation in the received ultrasound pulses 46, 46(M) for the client device 48 to be able to distinguish the receipt of the ultrasound pulses 46, 46(M) as being emitted from particular ultrasound beacons 42(1)-42(B), 42(M). The client device 48 can determine its location by subtracting timing offsets from the ultrasound pulse 46, 46(M) arrival times to determine the relevant propagation-induced time-difference-of-arrival.

The ultrasound pulse 46, 46(M) emission time offsets may be configured based on the synchronization information 51 to be larger than the maximum propagation time possible. The maximum propagation time possible depends on size in which an ultrasound beacon cluster 44(1)-44(A) is disposed and the speed of sound at approximately 330 meters per second (m/s) (i.e., about 1 foot per millisecond (ms)). For example, the ultrasound beacons 42(1)-42(B), 42(M) may be configured to emit ultrasound pulses 46, 46(M) in approximately one millisecond (1 ms) durations to minimize or eliminate temporal overlap.

As another non-limiting synchronization example, the ultrasound pulses 46, 46(M) could be emitted by different ultrasound beacons 42(1)-42(B), 42(M) simultaneously or substantially simultaneously with the different ultrasound beacons 42(1)-42(B), 42(M) emitting ultrasound pulses 46, 46(M) at different carrier frequencies. Temporal overlap of received ultrasound pulses 46, 46(M) by the client devices 48 can be tolerated since the ultrasound pulses 46, 46(M) are separated in the frequency domain. The client devices 48 can distinguish which ultrasound beacons 42(1)-42(B), 44(M) emitted which ultrasound pulses 46, 46(M) in a spectral analysis of the received ultrasound pulses 46, 46(M).

As another non-limiting synchronization example, the ultrasound pulses 46, 46(M) could be emitted by different ultrasound beacons 42(1)-42(B), 42(M) and at different carrier frequencies. In this manner the sequence of ultrasound pulses 46, 46(M) arriving at a client device 48 is the same as the emission sequence and temporal overlap of ultrasound pulses 46, 46(M) is avoided. The client devices 48 can also distinguish which ultrasound beacons 42(1)-42(B), 42(M) emitted which ultrasound pulses 46, 46(M) in a spectral analysis of the received ultrasound pulses 46, 46(M). This example may be particular useful for larger rooms or areas requiring a larger number of ultrasound beacons 42(1)-42(B), 42(M) to unambiguously associate ultrasound pulses 46, 46(M) as being emitted by particular ultrasound beacons 42(1)-42(B), 42(M).

Figure 6:
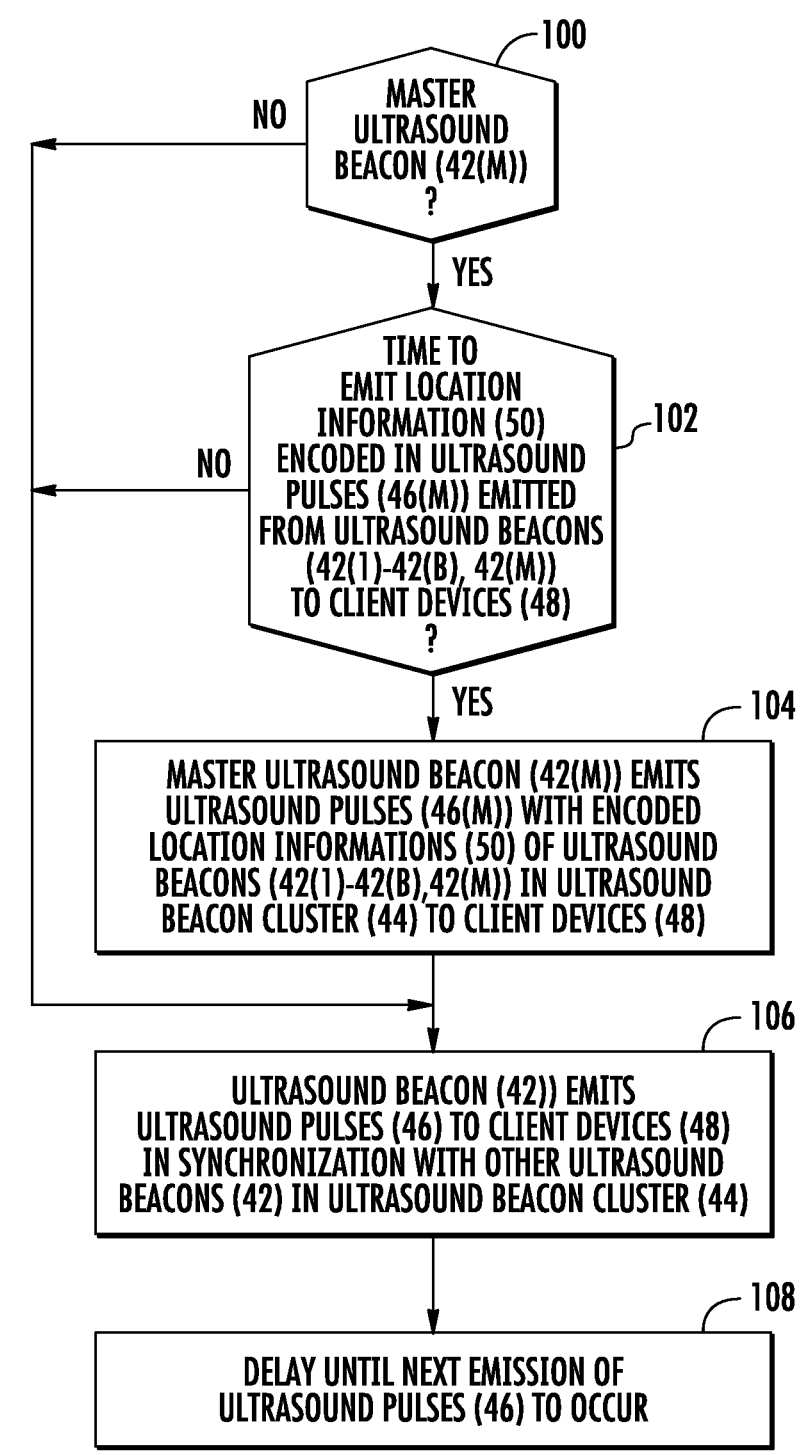
FIG. 6 is a flowchart illustrating a process of an ultrasound beacon emitting ultrasound pulses to be received by client devices, which can be used by the client devices to determine their location in a distributed communication system.

In this regard, FIG. 6 is a flowchart illustrating an exemplary process of an ultrasound beacon 42(1)-42(B), 42(M) emitting ultrasound pulses 46, 46(M) to be received by the client devices 48 to determine their location. As discussed above, the master ultrasound beacon 42(M) is configured to encode location information 50 of all the ultrasound beacons 42(1)-42(B), 42(M) in ultrasound pulses 46(M) emitted by the master ultrasound beacon 42(M) to the client devices 48. For example, the location information 50 could be enclosed in a coding scheme, such as frequency-shift-keying (FSK) for example, or other coding schemes, using the ultrasound pulses 46(M) as an over-the-air interface. Thus, if the ultrasound beacon 42(1)-42(B), 42(M) is a master ultrasound beacon 42(M) (block 100 in FIG. 6), the master ultrasound beacon 42(M) determines if it is time to encode the location information 50 in ultrasound pulses 46(M) to be emitted to the client devices 48 (block 102 in FIG. 6). It may only be desired to periodically, and less often than normal emission of ultrasound pulses 46(M) for time-difference-of-arrival analysis, emit ultrasound pulses 46(M) encoded with the location information 50 to the client devices 48. Alternatively, periodically in this context could mean as often as the ultrasound pulses 46(M) are emitted by the master ultrasound beacon 42(M) for time-difference-of-arrival analysis.

With continuing reference to FIG. 6, if it is time to encode the location information 50 in ultrasound pulses 46(M) to be emitted to the client devices 48 (block 102 in FIG. 6), the controller 80 of the master ultrasound beacon 42(M) causes the ultrasound emitter 96 in FIG. 5 to emit ultrasound pulses 46(M) with encoded location information 50 of the location of the ultrasound beacons 42(1)-42(B), 42(M) in the ultrasound beacon cluster 44 to the client devices 48 (block 104 in FIG. 6). Thereafter, regardless of whether the ultrasound beacon 42 is a master ultrasound beacon 42(M) or a non-master ultrasound beacon 42(1)-42(B), the controller 80 of the ultrasound beacon 42(1)-42(B), 42(M) controls emission of the ultrasound pulses 46(M) to be in synchronization with other ultrasound beacons 42(1)-42(B), 42(M) to the client devices 48 (block 106 in FIG. 6). The synchronization methods employed by the controller 80 can include any of the synchronization techniques previously described above to allow the client devices 48 to distinguish between which particular ultrasound beacons 42(1)-42(B), 42(M) the received ultrasound pulses 46, 46(M) were emitted. The controller 80 may delay the emission of the next ultrasound pulses 46, 46(M) by the ultrasound emitter 96 next depending on the synchronization method employed (block 108 in FIG. 6).

Figure 7A:
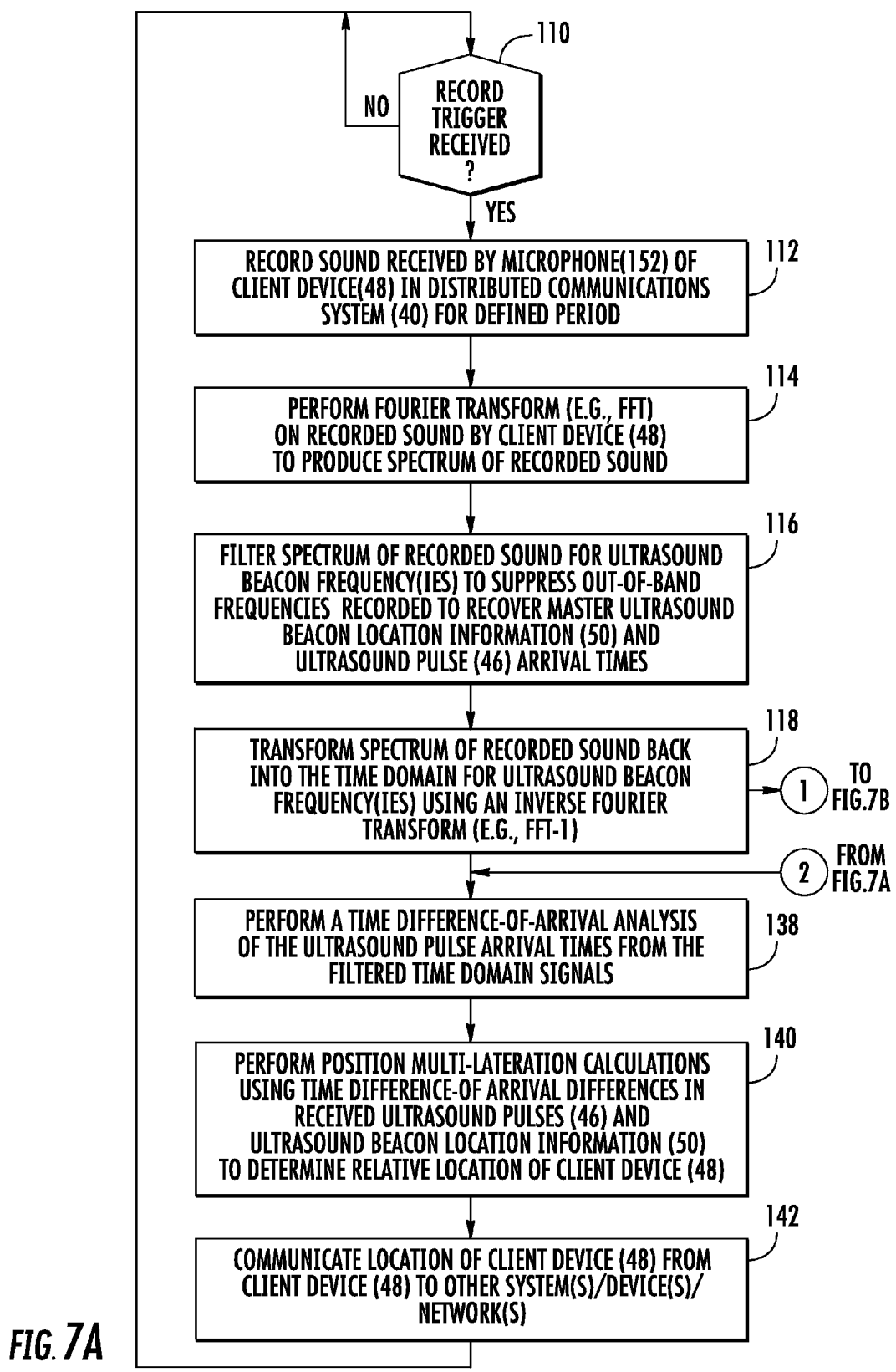
FIGS. 7A and 7B are flowcharts illustrating a process of a client device receiving ultrasound pulses from ultrasound beacons and the client devices using the time-difference-of-arrival of the received ultrasound pulses to device determine location.
Figure 7B:
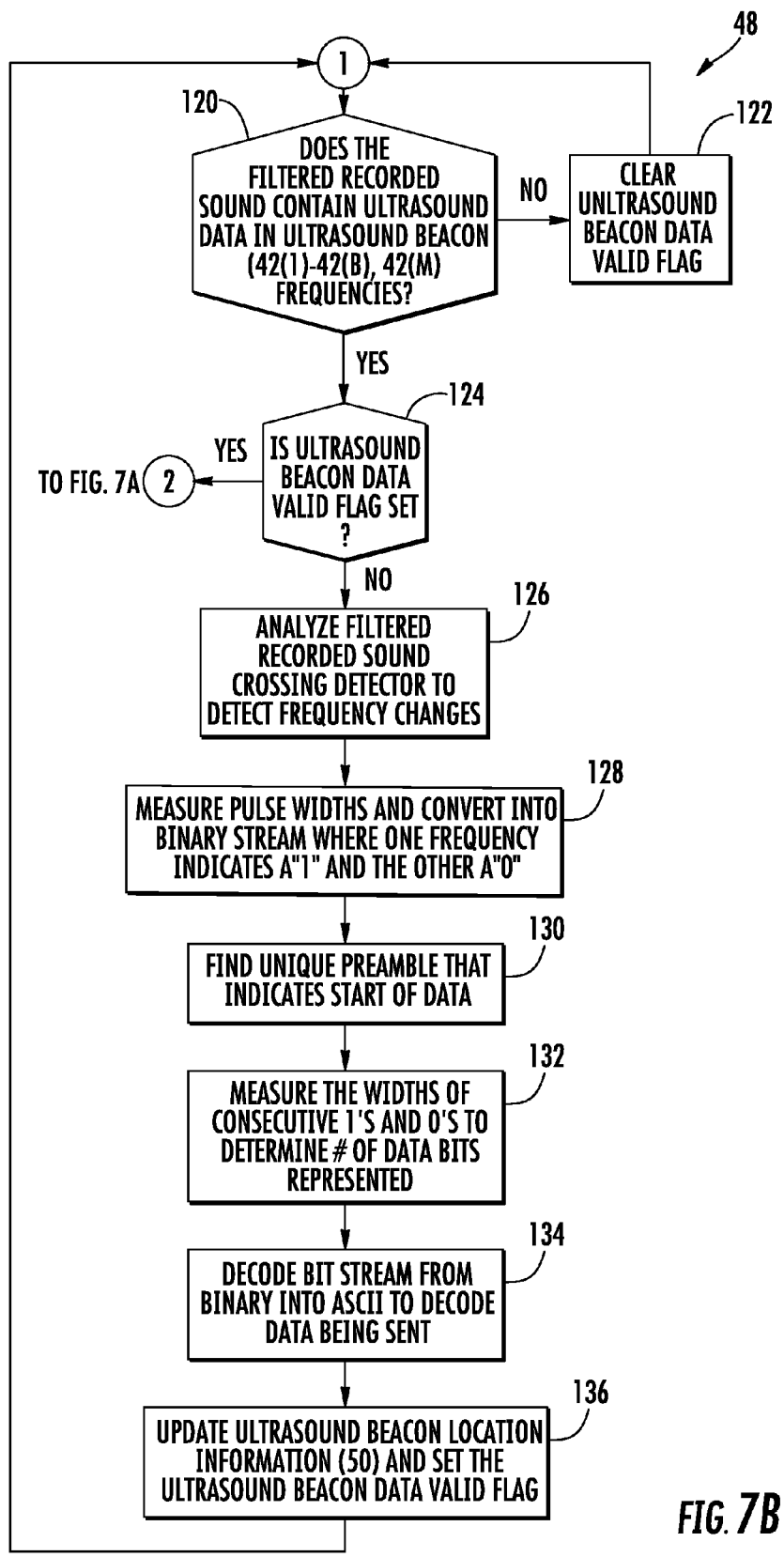
Figure 8:
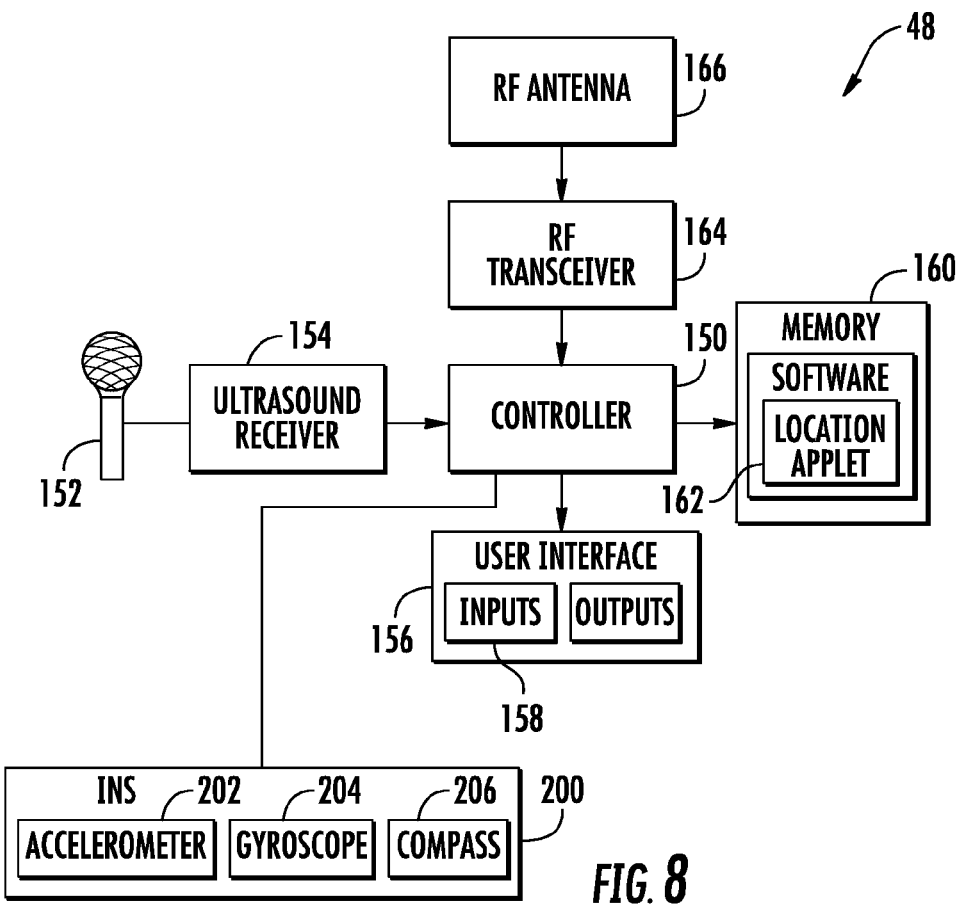
FIG. 8 is a schematic diagram of a client device configured with an ultrasound receiver configured to receive ultrasound pulses and/or location information encoded in ultrasound pulses emitted by ultrasound beacons in a distributed communication system.

FIGS. 7A and 7B are flowcharts illustrating an exemplary process of the client device 48 receiving ultrasound pulses 46, 46(M) from ultrasound beacons 42(1)-42(B), 42(M) and using the time-difference-of-arrival of the received ultrasound pulses 46, 46(M) to determine location. FIG. 8 is a schematic diagram of an exemplary client device 48 discussed in conjunction with FIGS. 7A and 7B. With reference to FIG. 7A, a controller 150 of the client device 48 (FIG. 8) determines if it is time to record sound received by a microphone 152 coupled to an ultrasound receiver 154 to receive ultrasound pulses 46, 46(M) (block 110 in FIG. 7A). It may be desired for the controller 150 of the client device 48 to only determine location at particular times to conserve power or processing capability of the controller 150. It may also be desired of the controller 150 of the client device 48 to only record sound to receive ultrasound pulses 46, 46(M) when directed by a user through input 158 on a user interface 156 provided in the client device 48.

With continuing reference to FIG. 7A, if it is not time to record sound to receive ultrasound pulses 46, 46(M), the controller 150 continues to make this determination (block 110 in FIG. 7A) until it is time to record sound received by a microphone 152 coupled to an ultrasound receiver 154. When it is time to record sound, the controller 150 directs the ultrasound receiver 154 to receive sound received by the microphone 152 and record the sound in memory 160 for a defined period of time (block 112 in FIG. 7A). The memory 160 also contains the instructions that are executed by the controller 150 to perform the location determination operations discussed herein in this example. For example, these instructions may be provide in a location applet 162 stored in memory 160.

With continuing reference to FIG. 7A, the ultrasound pulses 46, 46(M) are communicated by the ultrasound beacons 42(1)-42(B), 42(M) at one or more carrier frequencies. As discussed above, the ultrasound beacons 42(1)-42(B), 42(M) may be configured to emit ultrasound pulses 46, 46(M) on the same carrier frequency or different, unique carrier frequencies depending on whether ultrasound pulses 46, 46(M) are emitted in sequence synchronization or in simultaneous emission synchronization. Thus, the controller 150 is configured in this example to convert the recorded sound into a frequency domain by performing a Fourier transform on the recorded sound to produce a spectrum of the recorded sound (block 114 in FIG. 7A). The controller 150 may then be configured to filter the spectrum of recorded sound for the expected ultrasound beacon 42(1)-42(B), 42(M) carrier frequency(ies) to recover the location information 50 of the ultrasound beacons 42(1)-42(B), 42(M) and the ultrasound pulse 46, 46(M) arrival times (block 116 in FIG. 7A). Out-of-band frequencies may be filtered out of the recorded sound since the microphone 152 will pick up other surrounding environmental noise, including ambient noise in the recorded sound (block 116 in FIG. 7A).

With continuing reference to FIG. 7A, the controller 150 of the client device 48 may then transform the spectrum of recorded sound back into the time domain via a reverse Fourier transform so that the recorded sound can be analyzed in the time domain for time difference-of-arrival (block 118 in FIG. 7A). In this regard, the client device 48 can perform the exemplary process in FIG. 7B to process the filtered recorded sound to determine if location information 50 for the ultrasound beacons 42(1)-42(B), 42(M) is present in the filtered recorded sound. This processing example is shown assuming the location information 50 is encoded in the ultrasound pulses 46, 46(M) using FSK (Frequency Shift Key) encoding, but other encoding schemes could be employed, such as ASK (Amplitude Shift Keying), PSK (Phase Shift Keying), or other encoding schemes as non-limiting examples.

In this regard, as a non-limiting example, the client device 48 checks to see if the filtered, recorded sound transmission contains ultrasound pulses or data at the expected carrier frequency(ies) of the ultrasound beacons 42(1)-42(B), 42(M) (block 120 in FIG. 7B). If not, an ultrasound beacon data valid flag can be cleared in memory 160 of the client device 48 indicating that data expected to contain location information 50 is not present in the filtered recorded sound (block 122 in FIG. 7B). The process continues to check to see if the filtered recording sound transmission contains data expected to contain location information 50 (block 120 in FIG. 7B). When data is detected in the filtered recorded sound (block 120 in FIG. 7B), the client device 48 checks to see if the ultrasound beacon 42(1)-42(B), 42(M) locations are already known from prior received filtered recorded sound from the ultrasound beacon 42(1)-42(B), 42(M) by checking the ultrasound beacon data valid flag in memory 160 (block 124 in FIG. 7B). If set, the process returns to block 138 in FIG. 7A to continue with time-difference-of-arrival analysis, since location information 50 has been previously received and stored in memory 160 for use in time-difference-of-arrival analysis. If not set, the filtered recording sound is analyzed to recover the location information 50 for use by the client device 48 to perform time-difference-of-arrival analysis using a software zero crossing detector in this example, which outputs an array in memory 160 that indicates the pulse width of signal above zero and below zero (block 126 in FIG. 7B).

In this regard, with continuing reference to FIG. 7B, this array indicative of pulse width of signal above zero and below zero can then be passed to a routine, that measures the pulse widths and builds a binary array that indicates if the ultrasound waveform period was representative of a one or zero when encoded (block 128 in FIG. 7B). This array is then passed to a routine that looks for a preamble (indicated by a stream of ones longer than a single transmitted byte) (block 130 in FIG. 7B). The binary data present after the preamble is the desired data, which is a series of ones and zeros in which there are two (2) entries for one (1) cycle of the encoded frequency burst in this example (block 132 in FIG. 7B). The widths of the binary data are measured, and the original encoded binary data is reconstituted (block 134 in FIG. 7B). This binary data has all framing bits removed, and is converted to ASCII (block 134 in FIG. 7B). The ultrasound beacon 42(1)-42(B), 42(M) locations are determined from the data received, either directly (i.e. GPS coordinates were sent) or indirectly (i.e. a database key was sent, a lookup performed, and the coordinates are populated as the location information 50, as non-limiting examples (block 136 in FIG. 7B).

With reference back to FIG. 7A, with location information 50 obtained from ultrasound beacons 42(1)-42(B), 42(M), the controller 150 can then perform a time-difference-of-arrival analysis of the received ultrasound pulses 46, 46(M) from the filtered recorded sound in the time domain (block 138 in FIG. 7A). The controller 150 can determine its distance from the ultrasound beacons 42(1)-42(B), 42(M) in which ultrasound pulses 46, 46(M) are received based on associating the time-difference in the arrival of the ultrasound pulses 46, 46(M) with particular pairs of ultrasound beacons 42(1)-42(B), 42(M). Examples of time-difference-of-arrival analysis can be found in K. C. Ho and Y. T. Chan, IEEE Transactions on Aerospace and Electronic Systems, Vol. 29, No. 4, October 1993, pp. 1311-1322, which is incorporated herein by reference in its entirety. This time-difference-of-arrival analysis provides the relative distance of the client device 48 from the ultrasound beacons 42(1)-42(B), 42(M) in which ultrasound pulses 46, 46(M) are received. The controller 150 of the client device 48 can then perform position multi-lateration calculations using the time-difference-of-arrival information from the received ultrasound pulses 46, 46(M) and the location information 50 of the ultrasound beacons 42(1)-42(B), 42(M) to determine the relative location of the client device 48 to the ultrasound beacons 42(1)-42(B), 42(M) (block 140 in FIG. 7A). This relative location can be determined if ultrasound pulses 46, 46(M) from at least two (2) ultrasound beacons 42(1)-42(B), 42(M) are received by the client device 48. This relative location may be only relative to the location information 50 of the ultrasound beacons 42(1)-42(B), 42(M) provided to the client device 48. Location information 50 from two ultrasound beacons 42(1)-42(B), 42(M) can allow the client device 48 to determine a boundary of possible locations of the client device 48. Location information 50 from three (3) or more ultrasound beacons 42(1)-42(B), 42(M) can allow the client device 48 to determine exact locations relative to the two ultrasound beacons 42(1)-42(B), 42(M). As a non-limiting example, this relative location can be an absolute (i.e., non-relative) location (e.g., coordinates, also e.g., X, Y, and/or Z (i.e., longitude, latitude, and/or altitude) coordinates) if the location information 50 of the ultrasound beacons 42(1)-42(B), 42(M) provided to the client device 48 are absolute locations.

Figure 9:
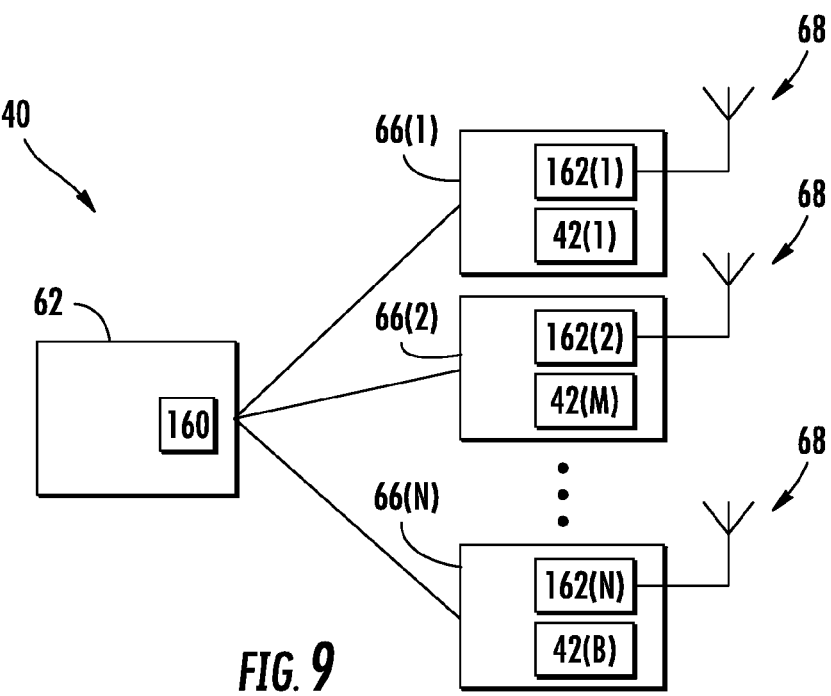
FIG. 9 is a schematic diagram illustrating ultrasound beacons, which may be the exemplary ultrasound beacon in FIG. 4, included in remote units in a distributed communication system, which may be the system in FIG. 2.

With continuing reference to FIG. 7A, the client device 48 can store its determined location in memory 160 and/or communicate this determined location to another device or network (block 142 in FIG. 7A). For example, as illustrated in FIG. 8, the client device 48 may include a RF transceiver 164 coupled to the controller 150 to process RF communication. The RF transceiver 164 is coupled to a RF antenna 166 for RF wireless transmissions and receptions. As a non-limiting example, the client device 48 could transmit the determined location wirelessly in a RF communication through the RF transceiver 164 and RF antenna 166 to another device or network. For example, the client device 48 could wirelessly transmit the determined location to a remote unit 66(1)-66(N) in the distributed communication system 40 in FIG. 2. Thus, the client device 48 could use the distributed communication system 40 to also distribute its determined location. The identification of the client device 48 may also be included in this RF communication. The remote unit 66(1)-66(N) could distribute this determined location of the client device 48 as an uplink communication signal 56U to the central unit 62. The determined location of the client device 48 could be stored in memory 150 of the central unit 62, as illustrated in FIG. 9. The determined location of the client device 48 could also be communicated by the central unit 62 to a base station 58 and/or the network 60. The process can repeat by returning back to block 110 in FIG. 7A until the next recording is triggered by the controller 150.

As discussed above and illustrated in FIG. 2, the ultrasound beacons 42(1)-42(B), 42(M) are provided in the distributed communication system 40 apart from other components in the distributed communication system 40. However, the ultrasound beacons 42(1)-42(B), 42(M) could be co-located and/or included in the other components and/or their housings in the distributed communication system 40. For example, as illustrated in FIG. 9, the ultrasound beacons 42(1)-42(B), 42(M) are shown as being co-located and included in the remote units 66(1)-66(N). In this manner, if the determined locations of the client devices 48 are provided to the remote unit 66(1)-66(N), wireless RF communication through the RF antenna 68 coupled to a RF interface 152(1)-152(N) in the remote units 66(1)-66(N) to do so would not be necessary. The ultrasound beacons 42(1)-42(B), 42(M) could provide the determined location information of the client devices 48 to the remote unit 66(1)-66(N) over wired connections/interfaces. Further, in this arrangement, if the synchronization information 51 is provided through the remote units 66(1)-66(N) to the ultrasound beacons 42(1)-42(B), 42(M), RF communication would not be necessary to provide the synchronization information 51 to the ultrasound beacons 42(1)-42(B), 42(M). The synchronization information 51 could be provided through wired connections/interfaces from the remote units 66(1)-66(N) to the ultrasound beacons 42(1)-42(B), 42(M).

Figure 10:
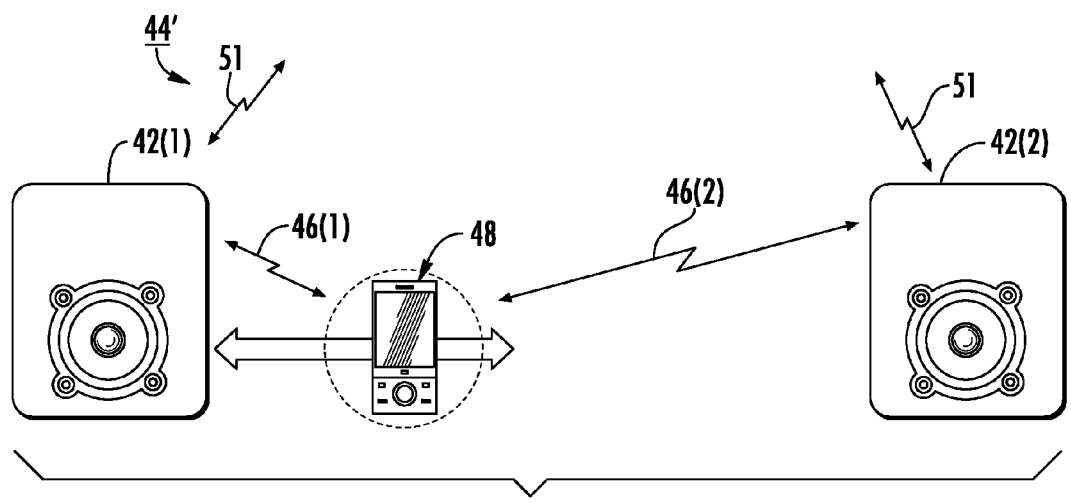
FIG. 10 illustrates an ultrasound cluster with only two ultrasound beacons according to an exemplary embodiment of the present disclosure.

In an exemplary embodiment, better illustrated in FIG. 10 an ultrasound cluster 44' includes only two ultrasound beacons 42(1) & 42(2). This embodiment is particularly well suited for use in hallways within a building. The received information 51 may include the reference clock signal and the ultrasound signals 46(1) and 46(2) are used by the client device 48 to calculate a first position as previously described. While this embodiment is well suited for use in corridors of buildings, ultrasound pulses are not likely to penetrate walls and enter rooms to either side of the corridor. Thus, the client device 48 needs some alternate method through which it may continue to calculate a current position.

In one embodiment, the alternate method is through the use of an inertial navigation system (INS) such as INS 200 of the client device 48 illustrated in FIG. 8. In an exemplary embodiment, the INS 200 includes an accelerometer 202, a gyroscope 204 and a compass 206. Many conventional smart phones include these elements and/or comparable INS elements. Additionally, while only one accelerometer 202 and one gyroscope 204 are illustrated, it should be appreciated that in some embodiments, a plurality of such devices may be present with orthogonal axes. Thus, in an exemplary embodiment, there may be three accelerometers 202 and three gyroscopes 204.

Figure 11:
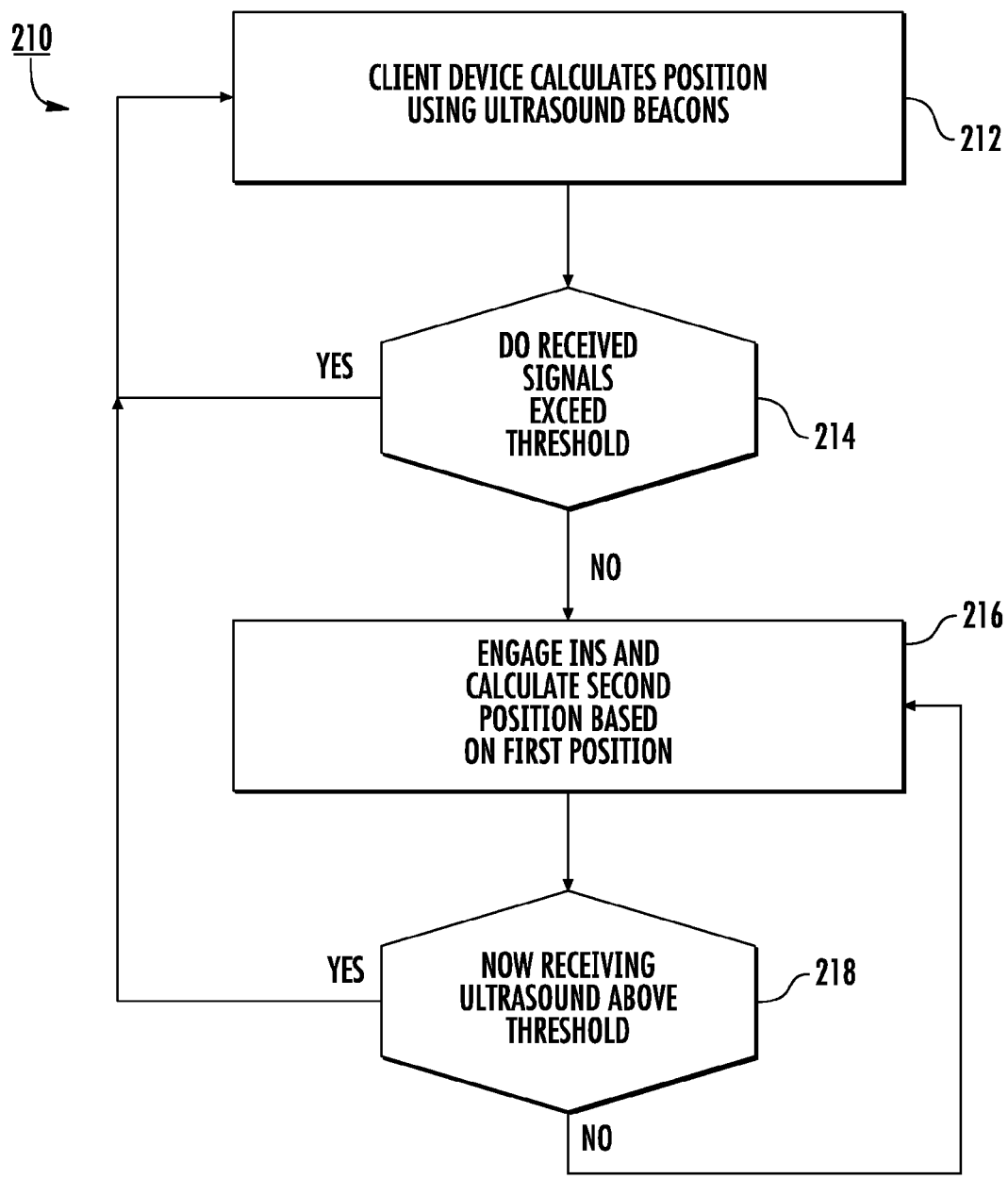
FIG. 11 is a flowchart illustrating alternate position calculation procedures.

An exemplary methodology 210 for using the INS 200 is provided with reference to FIG. 11. The client device 48 initially determines or calculates its position using signals received from the ultrasound beacons 42(1) and 42(2) (block 212). The position calculated from the ultrasound signals may be considered a first position. The client device 48 may move within the building and will monitor to see if the received ultrasound signals exceed a predetermined threshold (block 214). The predetermined threshold corresponds to a signal strength sufficient from which to extract meaningful data. If the answer to block 214 is yes, the signal strength remains above the threshold, and then the client device 48 calculates its position using the received ultrasounds signals from the ultrasound beacons 42. If the client device 48 moves enough, it may be passed to a different ultrasound cluster 44 or different ultrasound beacons 42.

If the answer to block 214 is no, the ultrasound signal strength has fallen below a predefined threshold, then the client device 48 begins using the INS 200 to calculate a second position (block 216) using the first position from the ultrasound beacons 42 as a starting point. Use of an INS 200 is well understood as evidenced by the work of D. H. Titterton and J. Weston in *Strapdown Inertial Navigation Technology*, published by American Institute of Aeronautics and Astronautics, Second Edition, 2004. If at a subsequent time, the client device 48 begins receiving ultrasound signals above the predefined threshold, then the client device may return to block 212 and calculate a current position using the ultrasound signals. Otherwise, the client device 48 continues to use the INS 200 to determine its current position.

Figure 12:
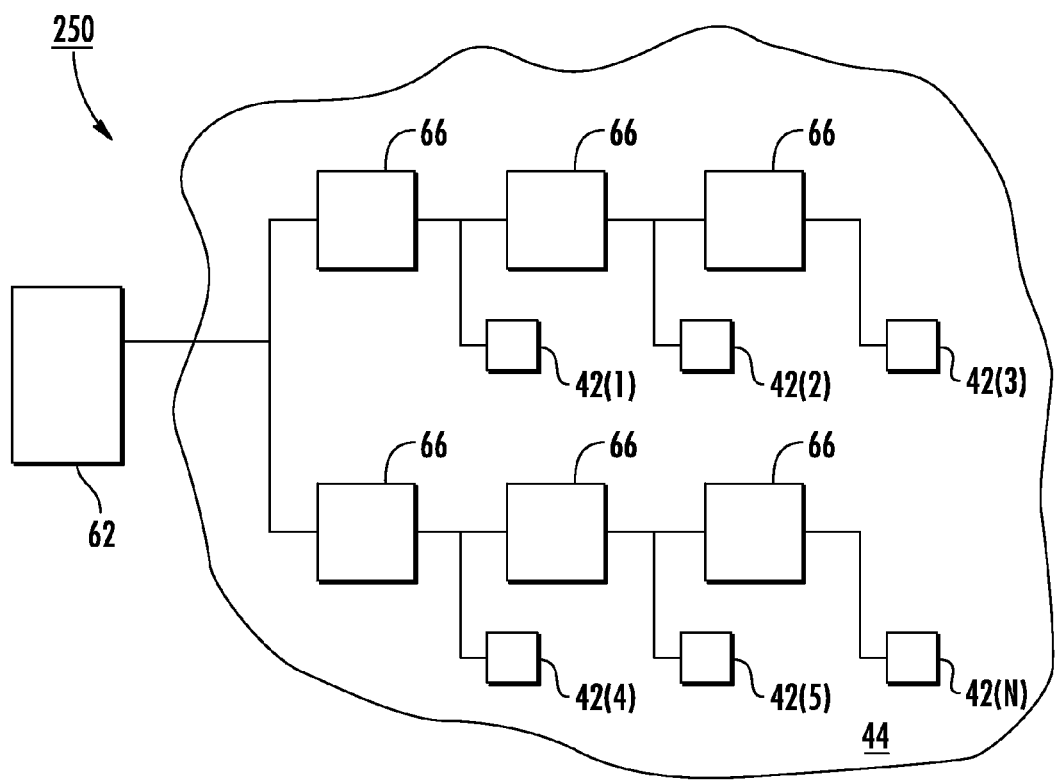
FIG. 12 is a schematic diagram of an alternate distributed communication system having a supplementary ultrasound system.

In an alternate embodiment, the ultrasound techniques of the present disclosure are used to assist other location based services (LBS) and systems supporting such LBS to pinpoint a location of a client device. That is, there are times when an LBS may not be able to pinpoint a location of a client device with sufficiently fine resolution. Thus, an ultrasound system may be concurrently deployed to supplement the location determination. In this regard, FIGS. 12 and 13 respectively illustrate a schematic diagram and a flow chart of such ultrasound assistance in a location determination system 250. The location determination system 250 may include a central unit 62 with a distributed communication system formed by remote units 66, which may include WLAN communication elements including location based services systems for WLAN systems such as those used in infrared, ZIGBEE, BLUETOOTH, cellular location elements, or comparable systems. In addition to the remote units 66, the distributed communication system may include ultrasound beacons 42(1)-42(N). The ultrasound beacons 42 may be in direct communication with the location determination system 250 (illustrated) or a separate system (not illustrated) as desired. It should be appreciated that the structure of the building in which the location determination system 250 is installed may create spots where the location determination elements of the WLAN components are inadequate to ascertain a location of a client device with sufficient particularity. In this regard, the ultrasound elements may be used to provide supplementary location information and the client device may use whichever system provides a better location resolution as desired and as further explicated with reference to FIG. 13.

Figure 13:
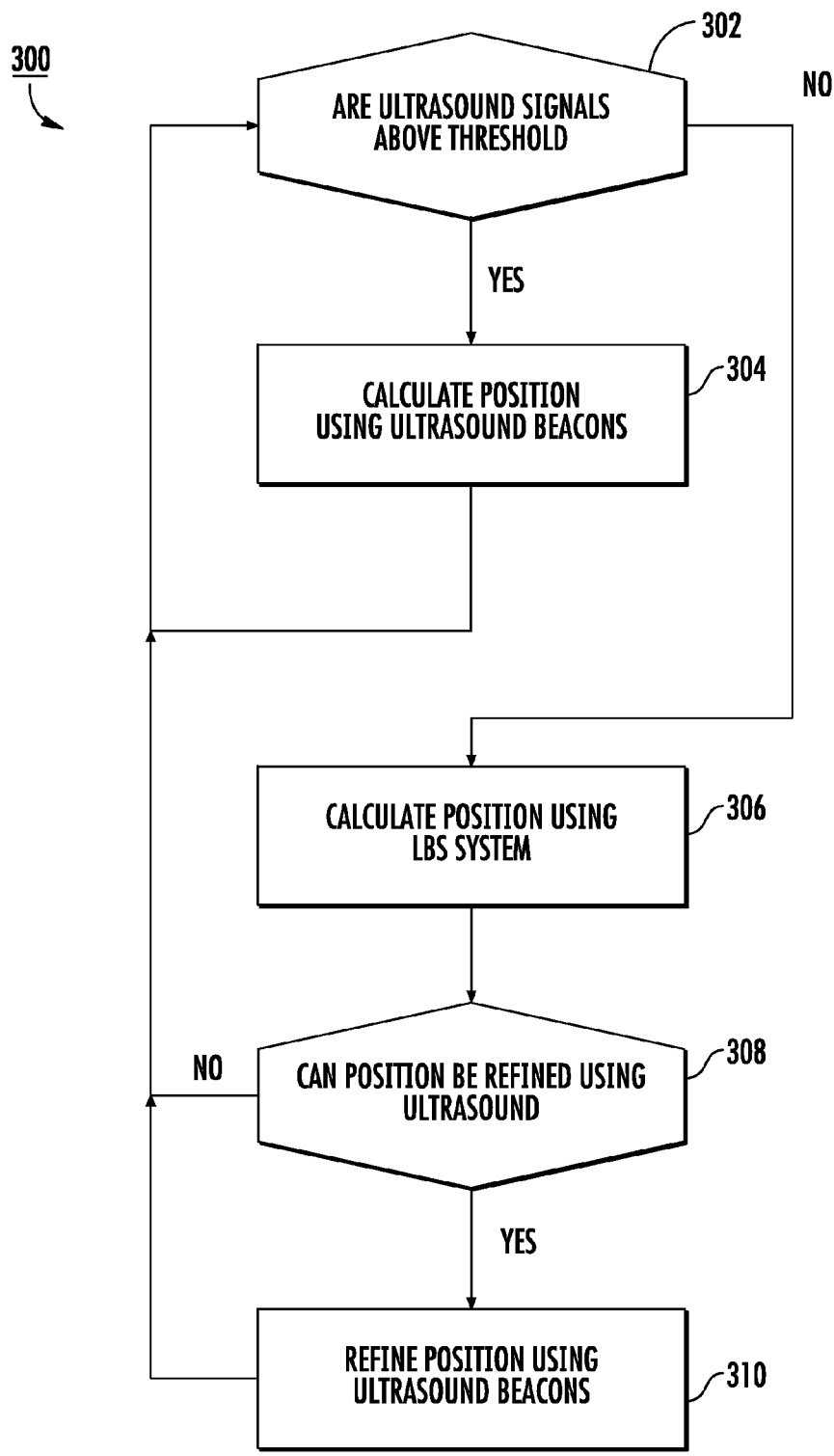
FIG. 13 is a flowchart illustrating an alternate embodiment of position calculation procedures for a system using a supplementary ultrasound system.

In this regard, FIG. 13 provides a flow chart 300, which begins by ascertaining whether the signal strength of the ultrasound signals from the ultrasound beacons 42 is above a predefined threshold (block 302). If the answer is yes, the signal strength of the ultrasound signals is above the predefined threshold, and then the client device 48 may calculate its position using the ultrasound beacons (block 304). Additionally, the client device 48 reports its current position to the central unit 62 through the remote units 66 as appropriate and/or as available.

With continuing reference to FIG. 13, if the answer to block 302 is no, the signal strength of the ultrasound signals is not above the predefined threshold, then the client device 48 may calculate its position using the signals from the WLAN elements such as remote units 66 (block 306). The client device 48 may monitor both the signals from the remote units 66 and the ultrasound beacons 42 to ascertain whether a position can be refined using the ultrasound signals (block 308). If the position can be refined, then the position is refined using the ultrasound signals (block 310). Again, this refined position may be reported to the system through the remote units 66 as desired. If the position cannot be refined, the process repeats as indicated. In essence, the embodiment of FIGS. 12 and 13 uses the better of the two location systems to assist the client device 48 to get the best location it can. This best location information may be provided back to the location system as desired. By way of analogy, the ultrasound system may replace checkpoint based RFID systems that are sometimes installed when room level accuracy is required.

As discussed above, the ultrasound beacons 42(1)-42(B), 42(M) and client devices 48 execute instructions from a computer-readable medium (i.e., instructions in memory). The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly include solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.), a machine-readable transmission medium (electrical, optical, acoustical or other form of propagated signals (e.g., carrier waves, infrared signals, digital signals, etc.)), etc.

Unless specifically stated otherwise, discussions utilizing terms such as "processing," "computing," "determining," "displaying," or the like, refer to processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. A variety of programming languages may be used to implement the teachings of the embodiments as described herein.

The various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps are described generally in terms of their functionality.

The logical blocks, modules, and circuits described in connection with the embodiments disclosed herein may be implemented with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor, which may be a microprocessor or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other known form of computer-readable medium. An exemplary storage medium is coupled to the processor such that the processor can read information from, and write information to, the storage medium. Alternatively, the storage medium may be integral to the processor. The processor and the storage medium may reside in an ASIC, which may reside in a remote station. Alternatively, the processor and the storage medium may reside as discrete components in a remote station, base station, or server.

The operational steps described in any of the embodiments herein are described to provide examples and discussion, and may be performed in different sequences other than the illustrated sequences. Operations described in a single step may actually be performed in a number of different steps, and one or more operational steps may be combined. Data, instructions, commands, information, bits, symbols, and chips that may be referenced throughout the above description may be represented by voltages, currents, electromagnetic waves, magnetic fields or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like.

The antenna arrangements may include any type of antenna desired, including but not limited to dipole, monopole, and slot antennas. The distributed antenna systems disclosed herein could include any type or number of communication mediums, including but not limited to electrical conductors, optical fiber, and air (i.e., wireless transmission). The systems may distribute and the antenna arrangements disclosed herein may be configured to transmit and receive any type of communication signals, including but not limited to RF communication signals and digital data communication signals, examples of which are described in U.S. patent application Ser. No. 12/892,424, incorporated herein by reference. Multiplexing, such as WDM and/or FDM, may be employed in any of the distributed antenna systems described herein, such as according to the examples described in U.S. patent application Ser. No. 12/892,424.

Various modifications and variations can be made without departing from the scope of the present disclosure. Since modifications combinations, sub-combinations and variations of the disclosed embodiments incorporating the spirit and substance of the present disclosure may occur to persons skilled in the art, the present disclosure should be construed to include everything within the scope of the appended claims and their equivalents.

What is claimed is:

1. A client device configured to communicate in a distributed communication system, comprising:
   a controller;
   an ultrasound receiver coupled to the controller, the ultrasound receiver configured to receive ultrasound pulses over at least one microphone; and
   a radio-frequency (RF) transceiver coupled to the controller, the RF transceiver configured to wirelessly receive and transmit RF communication signals over at least one antenna;
   an inertial navigation system (INS) operatively coupled to the controller;
   the controller configured to:
      calculate a first position using received ultrasound signals; and
      use the INS to calculate a second position from the first position when the received ultrasound signals are below a predefined threshold.

2. The client device of claim 1, wherein the controller is configured to calculate the position using received ultrasound signals by being configured to:
   record sound received from a plurality of ultrasound beacons over the at least one microphone over a defined period of time;
   filter the recorded sound about at least one ultrasound beacon frequency;
   recover a plurality of ultrasound pulses from the filtered recorded sound emitted from a plurality of ultrasound beacons in the distributed communication system;
   perform a time-difference-of-arrival analysis on the recovered plurality of ultrasound pulses; and
   determine a relative distance of the client device to the plurality of ultrasound beacons.

3. The client device of claim 1, wherein the controller is further configured to transform the recorded sound in a frequency domain to produce a spectrum of the recorded sound.

4. The client device of claim 3, wherein the controller is configured to filter the recorded sound by filtering the spectrum of the recorded sound about the at least one ultrasound beacon frequency.

5. The client device of claim 3, wherein the controller is further configured to transform filtered spectrum of recorded sound back to a time domain.

6. The client device of claim 5, wherein the INS comprises:
   at least one accelerometer;
   a compass; and
   at least one gyroscope.

7. The client device of claim 6, wherein the controller is configured to calculate a third position if the received ultrasound signals are subsequently above the predefined threshold.

8. The client device of claim 7, wherein the received ultrasound signals are received from a distributed antenna system.

9. The client device of claim 8, wherein the received ultrasounds signals are received staggered in time.

10. The client device of claim 2, wherein the controller is further configured to store the relative distance of the client device to the plurality of ultrasound beacons in memory.

11. The client device of claim 2, wherein the controller is further configured to:
   recover location information of a master ultrasound beacon in the distributed communication system from the filtered recorded sound from a plurality of ultrasound beacons in the distributed communication system; and determine the relative location of the client device to the master ultrasound beacon based on applying the location information to the relative distance.

12. The client device of claim 11, wherein the controller is configured to determine the relative location of the client device to the master ultrasound beacon based on performing position multi-lateration calculations using the determined time-difference-of-arrival of the recovered plurality of ultrasound pulses and the relative location of the client device to the master ultrasound beacon.

13. The client device of claim 11, wherein the controller is further configured to communicate the relative location of the client device to another device or network.

14. The client device of claim 13, wherein the controller is configured to communicate the relative location of the client device to a remote unit in the distributed communications system.

15. A method of a RF communication client device configured to communicate in a distributed communication system for determining location within the distributed communication system, comprising:
- calculating a first position using ultrasound signals received at the client device; and
- calculating a second position from the first position using an inertial navigation system within the client device when a signal strength of the ultrasound signals falls below a predefined threshold, wherein calculating the first position comprises:
- recording sound received from a plurality of ultrasound beacons over at least one microphone over a defined period of time;
- filtering the recorded sound about at least one ultrasound beacon frequency;
- recovering a plurality of ultrasound pulses from the filtered recorded sound emitted from a plurality of ultrasound beacons in the distributed communication system;
- performing a time-difference-of-arrival analysis on the recovered plurality of ultrasound pulses; and
- determining a relative distance of the RF communication client device to the plurality of ultrasound beacons.

16. The method of claim 15, further comprising transforming to the recorded sound in a frequency domain to produce a spectrum of the recorded sound.

17. The method of claim 16, comprising filtering the recorded sound by filtering the spectrum of the recorded sound about the at least one ultrasound beacon frequency.

18. The method of claim 16, further comprising transforming the filtered spectrum of recorded sound back to a time domain.

19. The method of claim 15, wherein calculating the second position comprises using at least one of an accelerometer, a compass, and a gyroscope.

20. The method of claim 15, further comprising calculating a third position if the received ultrasound signals are subsequently above the predefined threshold.

21. The method of claim 15, further comprising receiving the ultrasound signals from a distributed antenna system.

22. The method of claim 15, further comprising receiving the ultrasound signals staggered in time.

23. The method of claim 15, further comprising:
- recovering location information of a master ultrasound beacon in the distributed communication system from the filtered recorded sound from a plurality of ultrasound beacons in the distributed communication system; and
- determining a relative location of the RF communication client device to the master ultrasound beacon based on applying the location information to the relative distance.

24. The method of claim 23, further comprising determining the relative location of the RF communications client device to the master ultrasound beacon based on performing position multi-lateration calculations using the determined time-difference-of-arrival of the recovered plurality of ultrasound pulses and the relative location of the client device to the master ultrasound beacon.

25. The method of claim 23, comprising communicating the relative location of the client device to a remote unit in the distributed communication system.

* * * * *